US012627463B2

(12) United States Patent
Nyamwange

(10) Patent No.: US 12,627,463 B2
(45) Date of Patent: May 12, 2026

(54) USING AUTOMATIC HOMOMORPHIC ENCRYPTION IN A MULTI-CLOUD ENVIRONMENT TO SUPPORT TRANSLYTICAL DATA COMPUTATION USING AN ELASTIC HYBRID MEMORY CUBE

(71) Applicant: Bank of America Corporation, Charlotte, NC (US)

(72) Inventor: Elvis Nyamwange, Little Elm, TX (US)

(73) Assignee: Bank of America Corporation, Charlotte, NC (US)

( * ) Notice: Subject to any disclaimer, the term of this patent is extended or adjusted under 35 U.S.C. 154(b) by 120 days.

(21) Appl. No.: 18/781,248

(22) Filed: Jul. 23, 2024

(65) Prior Publication Data

US 2024/0380570 A1 Nov. 14, 2024

Related U.S. Application Data

(63) Continuation of application No. 17/537,738, filed on Nov. 30, 2021, now Pat. No. 12,081,647.

(51) Int. Cl.
| *H04L 9/00* | (2022.01) |
| *H04L 9/08* | (2006.01) |
| *H04L 9/30* | (2006.01) |
| *H04L 9/40* | (2022.01) |

(52) U.S. Cl.
CPC ............ *H04L 9/008* (2013.01); *H04L 9/0825* (2013.01); *H04L 9/088* (2013.01); *H04L 9/30* (2013.01); *H04L 63/02* (2013.01); *H04L 63/062* (2013.01)

(58) Field of Classification Search
CPC .............................. H04L 9/008; H04L 63/062
See application file for complete search history.

(56) References Cited

U.S. PATENT DOCUMENTS

| 9,509,494 B2 | 11/2016 | Nita |
| 10,043,029 B2 | 8/2018 | Murray |
| 11,042,663 B2 | 6/2021 | Erofeev et al. |
| (Continued) | | |

FOREIGN PATENT DOCUMENTS

| AU | 2017222576 B2 | 9/2020 |
| RU | 2017139315 A | 5/2019 |

*Primary Examiner* — Barbara B Anyan
(74) *Attorney, Agent, or Firm* — Banner & Witcoff, Ltd.

(57) ABSTRACT

Aspects of the disclosure relate to using automatic homomorphic encryption in a multi-cloud environment to support translytical data computation using an elastic hybrid memory cube. A computing platform may receive enterprise data from a data collection engine associated with an enterprise organization. The computing platform may inspect the enterprise data and discard enterprise data that fails to satisfy validation criteria. The computing platform may attach encryption rules to the remaining enterprise data. The computing platform may divide the enterprise data into discrete components and may continuously encrypt each component of the enterprise data using public keys. The computing platform may generate private keys that can be used to access the encrypted enterprise data, and may transmit the private keys to the enterprise organization. The computing platform, upon receipt of a private key from the enterprise organization, may determine whether the private key is authorized to access the encrypted enterprise data.

20 Claims, 11 Drawing Sheets

(56)         References Cited

U.S. PATENT DOCUMENTS

| | | | |
|---|---|---|---|
| 11,403,412 B2 * | 8/2022 | Huang | .................. H04L 63/062 |
| 2013/0339722 A1 | 12/2013 | Krendelev et al. | |
| 2017/0272455 A1 * | 9/2017 | Black | .................. H04W 12/069 |
| 2018/0331824 A1 * | 11/2018 | Racz | ................ G08B 13/19667 |

* cited by examiner

100

USING AUTOMATIC HOMOMORPHIC ENCRYPTION IN A MULTI-CLOUD ENVIRONMENT TO SUPPORT TRANSLYTICAL DATA COMPUTATION USING AN ELASTIC HYBRID MEMORY CUBE

CROSS REFERENCE TO RELATED APPLICATIONS

This application is a continuation of and claims priority to co-pending U.S. application Ser. No. 17/537,738, filed Nov. 30, 2021, and entitled, "Using Automatic Homomorphic Encryption in a Multi-Cloud Environment to Support Translytical Data Computation Using an Elastic Hybrid Memory Cube," which is incorporated herein by reference in its entirety.

BACKGROUND

Aspects of the disclosure relate to hardware and/or software for using automatic homomorphic encryption in a multi-cloud environment to support translytical data computation using an elastic hybrid memory cube. In particular, one or more aspects of the disclosure relate to continuously encrypting enterprise data using a self-auto homomorphic encryption engine to provide cost-efficient, real-time security measures to prevent unauthorized access to the enterprise data.

Current enterprise data security measures may be inefficient, expensive, and associated with technology that fails to protect against data breaches. Extract, transform, and load procedures (e.g., ETL procedures) within online transactional processing (OLTP) or online analytical processing (OLAP) may be time consuming procedures which often lead to delays in the data security process. When enterprise data is transmitted from an enterprise organization to either an OLTP system or an OLAP system, the system might not inspect the enterprise data to ensure corrupted enterprise data is removed from the data security process. The inclusion of corrupted enterprise data within the data security process further delays security processing and renders the entirety of the enterprise data vulnerable to attack.

Furthermore, once the enterprise data is transmitted to either the OLTP system or the OLAP system, the enterprise data may remain in a data pool rather than being processed immediately. While in the data pool, the enterprise data remains vulnerable to attack. Once the enterprise data enters the data security process, the enterprise data may be processed in a single iteration through the data security process, as opposed to continuous iterations through the data security process. A single iteration through the data security process leaves the enterprise data vulnerable to attack as there are fewer layers to infiltrate to access the enterprise data. Finally, once the enterprise data completes the data security process, the enterprise data may be associated with a single method of accessing the processed enterprise data (e.g., a single authorization password, a single private key, or the like). A single method of accessing the processed enterprise data renders the enterprise data vulnerable to attack as there are fewer levels of authorization to overcome to access the encrypted enterprise data. As such, current enterprise data security measures not only fail to utilize continuous encryption, but fail to initiate immediate security processing upon receipt of enterprise data.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure provide effective, efficient, and convenient technical solutions that address and overcome the technical problems associated with using automatic homomorphic encryption in a multi-cloud environment to support translytical data computation using an elastic hybrid memory cube.

In accordance with one or more embodiments, a method may comprise, at a computing device configured to operate within a multi-cloud environment and including a hybrid memory cube processor, at least one or more additional processors, and memory, transmitting, by a streaming engine and to a validation engine, enterprise data associated with an enterprise organization. The method may comprise determining, by the validation engine, whether the enterprise data satisfies validation criteria. The method may comprise, based on the enterprise data satisfying the validation criteria, dividing, by a self-auto homomorphic encryption engine, the enterprise data into discrete components. The method may comprise encrypting, by the self-auto homomorphic encryption engine, the discrete components of the enterprise data according to a plurality of encryption rules and using a public key of a plurality of public keys. The method may comprise transmitting, by the self-auto homomorphic encryption engine, encrypted enterprise data to a data access engine. The method may comprise receiving, by the data access engine and from the enterprise organization, a request to access the encrypted enterprise data using a private key of a plurality of private keys. The method may comprise transmitting a notification, wherein the notification indicates one of approval of the request to access the encrypted enterprise data or denial of the request to access the encrypted enterprise data.

In accordance with one or more embodiments, a computing platform may comprise a hybrid memory cube processor, at least one additional processor, a communication interface communicatively coupled to the at least one processor, and memory storing computer-readable instructions that, when executed by the hybrid memory cube processor and the at least one additional processor, cause the computing platform to transmit, by a streaming engine and to a validation engine, enterprise data associated with an enterprise organization. The computing platform may determine, by the validation engine, whether the enterprise data satisfies validation criteria. The computing platform may, based on the enterprise data satisfying the validation criteria, divide, by a self-auto homomorphic encryption engine, the enterprise data into discrete components. The computing platform may encrypt, by the self-auto homomorphic encryption engine, the discrete components of the enterprise data according to a plurality of encryption rules and using a public key of a plurality of public keys. The computing platform may transmit, by the self-auto homomorphic encryption engine, encrypted enterprise data to a data access engine. The computing platform may receive, by the data access engine and from the enterprise organization, a request to access the encrypted enterprise data using a private key of a plurality of private keys. The computing platform may transmit a notification, wherein the notification indicates one of approval of the request to access the encrypted enterprise data or denial of the request to access the encrypted enterprise data.

In accordance with one or more embodiments, one or more non-transitory computer-readable media storing instructions that, when executed by a computing platform comprising a hybrid memory cube processor, at least one additional processor, memory, and a communication interface, cause the computing platform to transmit, by a streaming engine and to a validation engine, enterprise data associated with an enterprise organization. The instructions, when executed, may cause the computing platform to determine, by the validation engine, whether the enterprise data satisfies validation criteria. The instructions, when executed, may cause the computing platform to, based on the enterprise data satisfying the validation criteria, divide, by a self-auto homomorphic encryption engine, the enterprise data into discrete components. The instructions, when executed, may cause the computing platform to encrypt, by the self-auto homomorphic encryption engine, the discrete components of the enterprise data according to a plurality of encryption rules and using a public key of a plurality of public keys. The instructions, when executed, may cause the computing platform to transmit, by the self-auto homomorphic encryption engine, encrypted enterprise data to a data access engine. The instructions, when executed, may cause the computing platform to receive, by the data access engine and from the enterprise organization, a request to access the encrypted enterprise data using a private key of a plurality of private keys. The instructions, when executed, may cause the computing platform to transmit a notification, wherein the notification indicates one of approval of the request to access the encrypted enterprise data or denial of the request to access the encrypted enterprise data.

These features, along with many others, are discussed in greater detail below.

BRIEF DESCRIPTION OF THE DRAWINGS

The present disclosure is illustrated by way of example and is not limited in the accompanying figures in which like reference numerals indicate similar elements and in which.

DETAILED DESCRIPTION

Figure 1A:
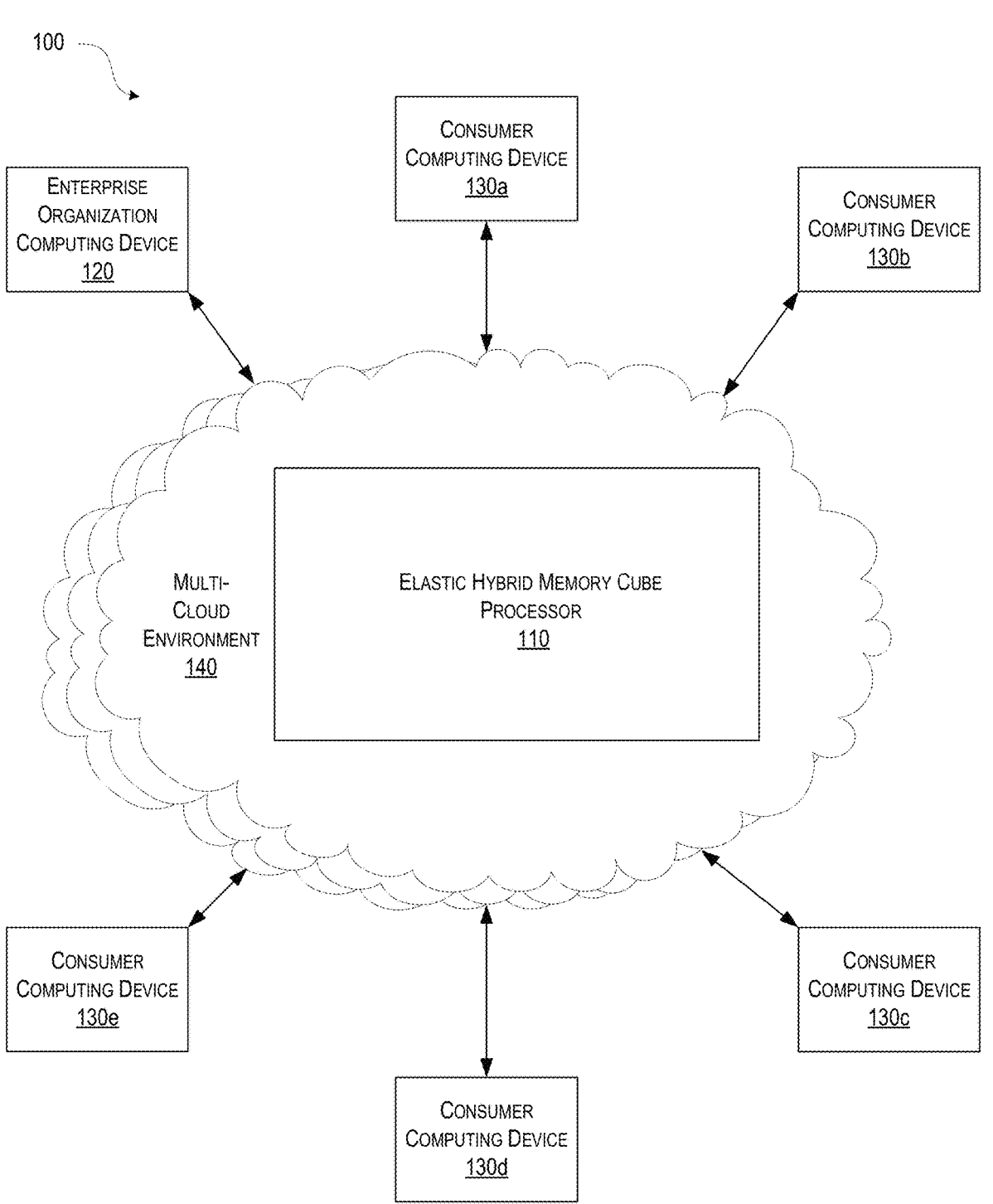
FIG. 1A depicts an illustrative example of a computer system for using self-automatic homomorphic encryption in a multi-cloud environment to support translytical data computation using an elastic hybrid memory cube in accordance with one or more example embodiments.

In the following description of various illustrative embodiments, reference is made to the accompanying drawings, which form a part hereof, and in which are shown, by way of illustration, various embodiments in which aspects of the disclosure may be practiced. It is to be understood that other embodiments may be utilized, and structural and functional modifications may be made, without departing from the scope of the present disclosure. Various aspects are capable of other embodiments and of being practiced or being carried out in various different ways.

It is noted that various connections between elements are discussed in the following description. It is noted that these connections are general and, unless specified otherwise, may be direct or indirect, wired or wireless, and that the specification is not intended to be limiting in this respect.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

As discussed above, current enterprise data security measures may be inefficient, expensive, and associated with technology that fails to protect against data breaches. Accordingly, proposed herein is a solution to the problem described above that includes using automatic homomorphic encryption in a multi-cloud environment to support translytical data computation using an clastic hybrid memory cube. For example, the elastic hybrid memory cube processor may comprise a validation engine that receives enterprise data from an enterprise organization via a data collection engine. The data collection engine may communicate with the enterprise organization to transmit the enterprise data across the multi-cloud environment and to the validation engine. The validation engine may inspect the enterprise data prior to transmitting the enterprise data to a self-auto homomorphic encryption engine. The validation engine may determine whether the received enterprise data satisfies validation rules and may discard the enterprise data that fails to satisfy the validation rules. The validation engine may transmit the remaining enterprise data to a logic engine. The logic engine may attach encryption rules to the enterprise data. The logic engine may generate public keys that may be used to encrypt the enterprise data and may generate private keys that may be used to access the encrypted enterprise data. The logic engine may transmit the enterprise data and the public keys to the self-auto homomorphic encryption engine. The self-auto homomorphic encryption engine may, upon receipt of encryption rules, automatically execute an encryption process and may permit the execution of actions upon the encrypted enterprise data (e.g., accessing and using the encrypted enterprise data without first decrypting the enterprise data). The logic engine may transmit the private keys to a data access engine and to a consumer computing device. The self-auto homomorphic encryption engine may separate the enterprise data into discrete components and may encrypt each component of the enterprise data according to the encryption rules and using a public key. The self-auto homomorphic encryption engine may continuously encrypt the components of the enterprise data such that a different public key is used during each iteration of the encryption process. The self-auto homomorphic encryption engine may transmit the encrypted enterprise data to the data access engine. The data access engine may store the encrypted enterprise data. The data access engine may receive, from the consumer computing device, a request to access the encrypted enterprise data wherein the request contains a private key. The data access engine may compare the private key to the public key that was used to encrypt the enterprise data during the most recent iteration of the encryption process. If the private key provided by the consumer computing device is the corresponding key to the public key that was used to the encrypt the enterprise data, then the data access engine may allow the consumer computing device to access the encrypted enterprise data. Alternatively, if the private key provided by the consumer computing device is not the corresponding key to the public key that was used to encrypt the enterprise data, then the data access engine may reject the request to access the encrypted enterprise data.

The disclosure provided herein is described, at least in part, in relation to a multi-cloud environment which supports the elastic hybrid memory cube that processes, encrypts, and stores the enterprise data. In at least some examples, the multi-cloud environment is comprised of at least two cloud computing environments that are of the same type (e.g., each cloud computing environment within the multi-cloud environment is a public cloud, each cloud computing environment within the multi-cloud environment is a private cloud, or the like). The multi-cloud environment may facilitate communication and data transmission between the enterprise organization, the consumer computing device, and the clastic hybrid memory cube processor. Computer Architecture FIG. 1A depicts an illustrative example of a computer system 100 that may be used for using automatic homomorphic encryption, in real-time or near real-time, in a multi-cloud environment to support translytical data computation using an clastic hybrid memory cube. Computer system 100 may comprise one or more computing devices, including at least elastic hybrid memory cube processor 110, enterprise organization computing device 120, and consumer computing devices 130a-130e. While FIG. 1A depicts more than one consumer computing device (e.g. consumer computing devices 130a-130e), each of consumer computing devices 130a-130e may be configured in accordance with the features described herein. While the description herein may make reference to consumer computing device 130, it is important to note that the functions described in connection with consumer computing device 130 may also be performed by any one of consumer computing devices 130a-130e. Each one of consumer computing devices 130a-130e and enterprise organization computing device 120 may be configured to communicate with elastic hybrid memory cube processor 110 through multi-cloud environment 140. In some arrangements, computer system 100 may include additional computing devices and cloud environments that are not depicted in FIG. 1A, which may also be configured to interact with elastic hybrid memory cube processor 110 and, in some instances, consumer computing device 130.

Elastic hybrid memory cube processor 110 may be associated with a distinct entity such as an enterprise organization, company, school, government, or the like, and may comprise one or more personal computer(s), server computer(s), hand-held or laptop device(s), multiprocessor system(s), microprocessor-based system(s), set top box(es), programmable consumer electronic device(s), network personal computer(s) (PC), minicomputer(s), mainframe computer(s), distributed computing environment(s), or the like Elastic hybrid memory cube processor 110 may include computing hardware and/or software that may host various data and applications for performing tasks of the centralized entity and interacting with consumer computing device 130, as well as other computing devices. As discussed in detail in connection with FIG. 1B, elastic hybrid memory cube processor 110 may use validation engine 111, logic engine 112, public key and private key generator 113, data access engine 114, self-auto homomorphic encryption engine 115, processor(s) 116, enterprise data database 117, public key and private key database 118, and database 119 to inspect, encrypt, and store enterprise data. Each computing device within elastic hybrid memory cube processor 110 may contain processor(s) 116 and database 119, which may be stored in memory of the one or more computing devices of elastic hybrid memory cube processor 110. Through execution of computer-readable instructions stored in memory, the computing devices of elastic hybrid memory cube processor 110 may be configured to perform functions of the centralized entity and store the data generated during the performance of such functions in database 119.

In some arrangements, elastic hybrid memory cube processor 110 may include and/or be part of enterprise information technology infrastructure and may host a plurality of enterprise applications, enterprise databases, and/or other enterprise resources. Such applications may be executed on one or more computing devices included in elastic hybrid memory cube processor 110 using distributed computing technology or the like. In some instances, elastic hybrid memory cube processor 110 may include a relatively large number of servers that may support operations of the enterprise organization, such as a financial institution.

Enterprise organization computing device 120 may be configured to interact with elastic hybrid memory cube processor 110 through multi-cloud environment 140. Enterprise organization computing device 120 may be associated with the enterprise organization, which may generate enterprise data. The enterprise organization may utilize cloud storage (e.g., multi-cloud environment 140) to store the generated enterprise data. To do so, enterprise organization computing device 120 may transmit the enterprise data to multi-cloud environment 140. Enterprise organization computing device 120 may store the enterprise data within database 146 of multi-cloud environment 140, as discussed further in connection with FIG. 1C. Enterprise organization computing device 120 may continuously transmit enterprise data to database 146 such that the entirety of the enterprise data generated by the enterprise organization is stored in database 146 of multi-cloud environment 140, as opposed to local storage on physical computing devices within the enterprise organization.

Enterprise organization computing device 120 may transmit validation criteria to validation engine 111. The validation criteria may indicate criteria for determining whether the enterprise data may proceed to logic engine 112 (e.g., whether the enterprise data is corrupted, whether the enterprise data contains blank data entries, or the like). The enterprise organization may be interested in encrypting only the enterprise data that satisfies the validation criteria (e.g., the enterprise data that is not corrupted, the enterprise data that contains populated data entries, or the like). Over time, the enterprise organization may develop new or additional validation criteria. In such instances, enterprise organization computing device 120 may transmit the new or additional validation criteria to validation engine 111.

Enterprise organization computing device 120 may transmit encryption rules to logic engine 112. The encryption rules may indicate duration and frequency parameters that are associated with the encryption process (e.g., the duration of the encryption process, the number of iterations associated with the encryption process, the frequency with which public and private key pairs should be generated, or the like). Over time, the enterprise organization may develop new or additional encryption rules. In such instances, enterprise organization computing device 120 may transmit the new or additional encryption rules to logic engine 112.

Enterprise organization computing device 120 may receive, from logic engine 112, private keys that may be used to access the encrypted enterprise data, as discussed in connection with FIG. 1B. Enterprise organization computing device 120 may receive private keys, which correspond to the public keys that are used to encrypt the enterprise data, each time the enterprise data is encrypted by self-auto homomorphic encryption engine 115 of elastic hybrid memory cube processor 110. Enterprise organization computing device 120 may request access to the encrypted enterprise data using the most recently received private key.

Consumer computing device 130 may be configured to interact with elastic hybrid memory cube processor 110 through multi-cloud environment 140. In some instances, consumer computing device 130 may be configured to receive and transmit information corresponding to system requests through particular channels and/or representations of webpages and/or applications associated with elastic hybrid memory cube processor 110.

Consumer computing device 130 may be associated with entities within the enterprise organization or may be associated with entities outside of the enterprise organization. If consumer computing device 130 is associated with an entity within the enterprise organization, the entity associated with consumer computing device 130 may be different from the entity associated with enterprise organization computing device 120. For example, the entity within the enterprise organization that is associated with consumer computing device 130 may be associated with a level of authorization that is more restrictive than the level of authorization associated with enterprise organization computing device 120. Alternatively, consumer computing device 130 may be associated with an entity outside of the enterprise organization. If consumer computing device 130 is associated with an entity outside of the enterprise organization, consumer computing device 130 may be associated with a level of authorization that is more restrictive than the level of authorization associated with either one of enterprise organization computing device 120 or consumer computing device 130 when consumer computing device 130 is associated with an entity within the enterprise organization.

Consumer computing device 130 may receive, from logic engine 112, private keys that may be used to access the encrypted enterprise data, as discussed in connection with FIG. 1B. Consumer computing device 130 may receive private keys, which correspond to the public keys that are used to encrypt the enterprise data, each time the enterprise data is encrypted by self-auto homomorphic encryption engine 115 of elastic hybrid memory cube processor 110. Consumer computing device 130 may request access to the encrypted enterprise data using the most recently received private key.

As stated above, computer system 100 also may include one or more networks, which may interconnect one or more of elastic hybrid memory cube processor 110, enterprise organization computing device 120, and consumer computing device 130. For example, computer system 100 may include multi-cloud environment 140. Multi-cloud environment 140 may include two or more cloud computing environments wherein each cloud computing environment within multi-cloud environment 140, in at least some examples, is of the same type (e.g., each cloud computing environment within multi-cloud environment 140 is a public cloud computing environment, each cloud computing environment within multi-cloud environment 140 is a private cloud computing environment, or the like). As discussed in connection with FIG. 1C, multi-cloud environment 140 may comprise elastic hybrid memory cube processor 110, processor(s) 141, memory(s) 142, streaming engine 143, batch collection engine 144, altered data collection engine 145, and database 146. Furthermore, computer system 100 may include a cloud computing environment configured to interconnect each of the computing devices comprising elastic hybrid memory cube processor 110.

Figure 1B:
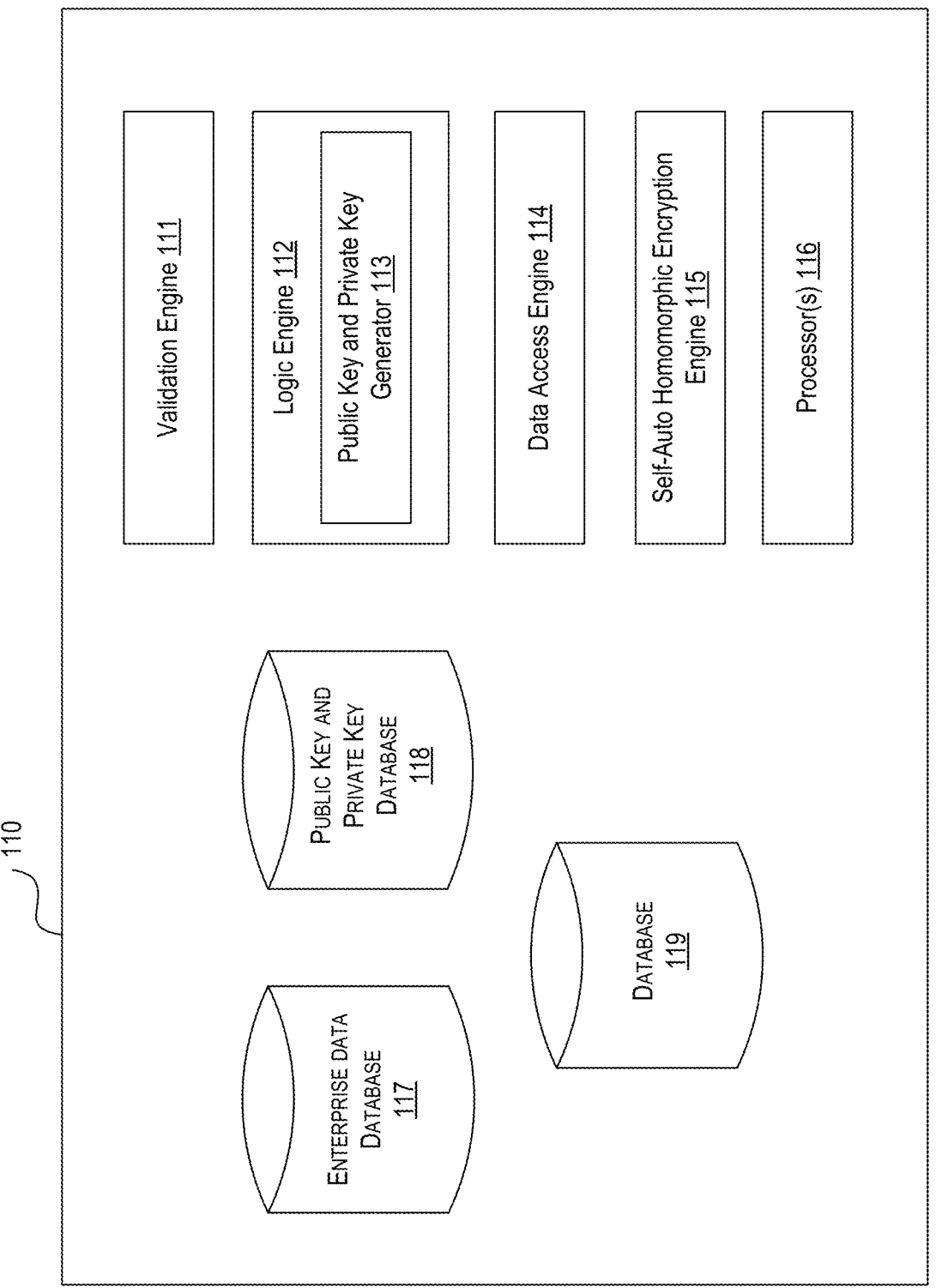
FIG. 1B depicts an illustrative example of the elastic hybrid memory cube processor that may be used for using self-automatic homomorphic encryption in a multi-cloud environment to support translytical data computation using an elastic hybrid memory cube in accordance with one or more example embodiments.

FIG. 1B depicts the components of elastic hybrid memory cube processor 110 that may be used for using automatic homomorphic encryption, in real-time or near real-time, in a multi-cloud environment to support translytical data computation using an elastic hybrid memory cube. As discussed above, elastic hybrid memory cube processor 110 may contain validation engine 111, logic engine 112, public key and private key generator 113, data access engine 114, self-auto homomorphic encryption engine 115, processor(s) 116, enterprise data database 117, public key and private key database 118, and database 119. Validation engine 111 may receive enterprise data from any one of streaming engine 143, batch collection engine 144, or altered data collection engine 145 of multi-cloud environment 140. Validation engine 111 may be configured to inspect the enterprise data to ensure the enterprise data satisfies validation criteria. Validation engine 111 may receive the validation criteria from enterprise organization computing device 120.

Enterprise organization computing device 120 may transmit validation criteria to validation engine 111. The validation criteria may indicate criteria for determining whether the enterprise data may proceed to logic engine 112 (e.g., whether the enterprise data is corrupted). The enterprise organization may be interested in encrypting only the enterprise data that satisfies the validation criteria (e.g., the enterprise data that is not corrupted). The enterprise organization may develop new or additional validation criteria. In such instances, enterprise organization computing device 120 may transmit the new or additional validation criteria to validation engine 111.

Validation engine 111 may use the validation criteria to determine whether the enterprise data should be transmitted to logic engine 112. If validation engine 111 determines that the enterprise data satisfies the validation criteria, validation engine 111 may retain the enterprise data within the encryption process. Alternatively, if validation engine 111 determines that the enterprise data fails to satisfy the validation criteria, validation engine 111 may remove the enterprise data from the encryption process such that the enterprise data will not proceed through the remaining stages of the encryption process. Validation engine 111 may store the enterprise data that satisfies the validation criteria in enterprise data database 117. Validation engine 111 may transmit, to logic engine 112, the enterprise data that satisfies that validation criteria.

Logic engine 112 may receive, from validation engine 111, the enterprise data that satisfies the validation criteria. Logic engine 112 may also receive encryption rules from enterprise organization computing device 120. The encryption rules may indicate duration and frequency parameters that are associated with the encryption process (e.g., the duration of the encryption process, the number of iterations associated with the encryption process, the frequency with which public and private key pairs should be generated, or the like). The enterprise organization may develop new or additional encryption rules. In such instances, logic engine 112 may receive the new or additional encryption rules from enterprise organization computing device 120. Logic engine 112 may attach the encryption rules to the enterprise data such that self-auto homomorphic encryption engine 115 may reference the encryption rules prior to initiating the encryption process.

To attach the encryption rules to the enterprise data, logic engine 112 may tag the enterprise data. Tagging the enterprise data may comprise attaching an identifier (e.g., a numerical identifier, a keyword, or the like) to the enterprise data. In some instances, logic engine 112 may receive more than one set of enterprise data such that more than one set of enterprise data may undergo the encryption process. Therefore, the identifier may be used to locate each set of enterprise data throughout the encryption process. Tagging the data may further comprise listing each of the encryption rules associated with the enterprise data. In some instances, different sets of enterprise data may be associated with different encryption rules. Therefore, the tag associated with the enterprise data may not only identify the enterprise data, but may identify the encryption rules associated with the enterprise data. Logic engine 112 may transmit the tagged enterprise data to self-auto homomorphic encryption engine 115.

Logic engine 112 may communicate with public key and private key generator 113. Logic engine 112 may use the encryption rules to instruct public key and private key generator 113 to generate public and private key pairs for the enterprise data. The number of public and private key pairs that should be generated may be determined by the encryption rules. Logic engine 112 may receive, from public key and private key generator 113, a plurality of public and private key pairs associated with the enterprise data. Logic engine 112 may store the public and private key pairs in public key and private key database 118. Logic engine 112 may transmit the public keys to self-auto homomorphic encryption engine 115. Self-auto homomorphic encryption engine 115 may use the public keys to encrypt the enterprise data. Logic engine 112 may transmit the private keys to data access engine 114 and consumer computing device 130. Data access engine 114 and consumer computing device 130 may use the private keys to access the encrypted enterprise data. Data access engine 114 and consumer computing device 130 may receive a new private key each time a public key is used to encrypt the enterprise data such that the received private key corresponds to the public key that was most recently used to encrypt the enterprise data.

Data access engine 114 may receive, from self-auto homomorphic encryption engine 115, and store the encrypted enterprise data. Data access engine 114 may further receive, from logic engine 112, and store the private keys that may be used to access the encrypted enterprise data. Data access engine 114 may receive, from consumer computing device 130, a request to access the encrypted enterprise data wherein the request may contain a private key. Data access engine 114 may compare the private key in the data request to the private keys received from logic engine 112 to determine whether consumer computing device 130 is authorized to access the encrypted enterprise data. If the private key in the data request matches the most recent private key received from logic engine 112, data access engine 114 may determine that consumer computing device 130 is authorized to access the encrypted enterprise data and may grant access to the encrypted enterprise data. Alternatively, if the private key in the data request fails to match the most recent private key received from logic engine 112, data access engine 114 may determine that consumer computing device 130 is not authorized to access the encrypted enterprise data and may deny access to the encrypted enterprise data.

Self-auto homomorphic encryption engine 115 may receive and store a plurality of public keys and the tagged enterprise data from logic engine 112. Self-auto homomorphic encryption engine 115 may divide the enterprise data into discrete components such that each component of enterprise data may not only be encrypted individually, but may be encrypted using the same public key. Using the identifier associated with the enterprise data, self-auto homomorphic encryption engine 115 may maintain the relationship between the discrete components of the enterprise data. Self-auto homomorphic encryption engine 115 may use the encryption rules to determine the duration and the frequency of the period of encryption. Self-auto homomorphic encryption engine 115 may continuously encrypt each discrete component of the enterprise data in accordance with the encryption rules. Self-auto homomorphic encryption engine 115 may use a different public key to encrypt the enterprise data during each iteration of the encryption process such that each iteration of the encryption process is associated with a different public key. Self-auto homomorphic encryption engine 115 may store the encrypted enterprise data within enterprise data database 117 and may transmit the encrypted enterprise data to data access engine 114.

Enterprise data database 117 may contain the enterprise data, received by validation engine 111, that satisfies the validation criteria. Enterprise data database 117 may further contain the encrypted enterprise data, generated by self-auto homomorphic encryption engine 115. Self-auto homomorphic encryption engine 115 may be associated with a first level of access (e.g., a least restrictive level of access). As such, self-auto homomorphic encryption engine 115 may perform actions upon the enterprise data within enterprise data database 117 (e.g., add data to the database, update existing data, remove data from the database, re-organize the data within the database, or the like). Validation engine 111 may be associated with a second level of access (e.g., a level of access with modified permissions). As such, validation engine 111 may perform fewer actions upon the enterprise data than the entities associated with the first level of access (e.g., may be permitted to add enterprise data to the database, but might not be permitted to remove, update, or re-organize the existing enterprise data). Logic engine 112 and data access engine 114 may be associated with a third level of access (e.g. a most restrictive level of access). As such, logic engine 112 and data access engine 114 may perform limited actions upon the enterprise data (e.g., may only be permitted to view the data).

Public key and private key database 118 may contain the public and private key pairs generated by public key and private key generator 113. Public key and private key generator 113 may be associated with a first level of access (e.g., the least restrictive level of access). As such, public key and private key generator 113 may perform actions upon the data within public key and private key database 118 (e.g., add data, remove data, update data, re-organize data, or the like). Data access engine 114 and self-auto homomorphic encryption engine 115 may be associated with a second level of access (e.g., the most restrictive level of access). As such, data access engine 114 and self-auto homomorphic encryption engine 115 may perform limited actions upon the enterprise data (e.g., may only be permitted to view the data).

Figure 1C:
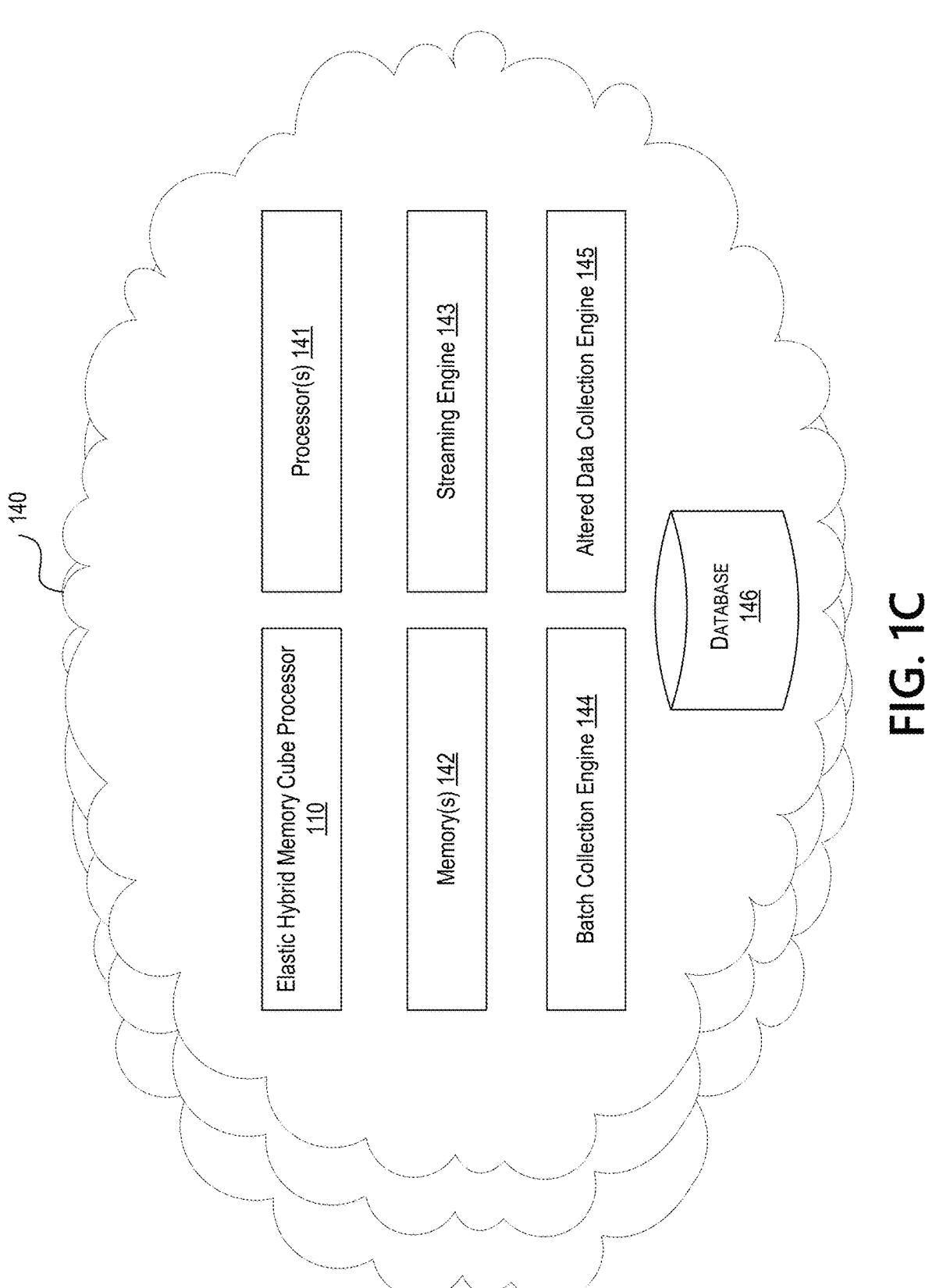
FIG. 1C depicts an illustrative example of the multi-cloud environment that may be used for using self-automatic homomorphic encryption in a multi-cloud environment to support translytical data computation using an elastic hybrid memory cube in accordance with one or more example embodiments.

FIG. 1C depicts the components of multi-cloud environment 140 that may be used for using automatic homomorphic encryption, in real-time or near real-time, in a multi-cloud environment to support translytical data computation using an elastic hybrid memory cube. As discussed above, multi-cloud environment 140 may contain elastic hybrid memory cube processor 110, processor(s) 141, memory(s) 142, streaming engine 143, batch collection engine 144, altered data collection engine 145, and database 146. As discussed in connection with FIG. 1B, elastic hybrid memory cube processor 110 may contain validation engine 111, logic engine 112, public key and private key generator 113, data access engine 114, self-auto homomorphic encryption engine 115, processor(s) 116, enterprise data database 117, public key and private key database 118, and database 119.

Each one of streaming engine 143, batch collection engine 144, and altered data collection engine 145 may feature a different method of data collection that may be used to transmit raw enterprise data from the enterprise organization to validation engine 111. Any one of streaming engine 143, batch collecting engine 144, or altered data collection engine 145 may be used transmit raw enterprise data to validation engine 111. Streaming engine 143 may communicate with database 146. Database 146 may contain enterprise data that is generated by the enterprise organization and transmitted by enterprise organization computing device 120 to database 146. The data within database 146 may be raw enterprise data (e.g., enterprise data that has not been processed by validation engine 111 in accordance with the validation criteria). Enterprise organization computing device 120 may continuously transmit raw enterprise data to database 146 as the enterprise organization generates the raw enterprise data. Streaming engine 143 may access the continuous transmission of raw enterprise data and may transmit the raw enterprise data to validation engine 111.

Batch collection engine 144 may communicate with database 146 at scheduled intervals (e.g., once per hour, twice per week, four times per month, or the like). At each interval, batch collection engine 144 may retrieve, from database 146, the raw enterprise data that was transmitted to database 146 in the time since the previous retrieval. At each interval, batch collection engine 144 may transmit the retrieved raw enterprise data to validation engine 111.

Altered data collection engine 145 may communicate with database 146. Altered data collection engine 145 may continuously monitor the raw enterprise data that is transmitted to database 146 by enterprise organization computing device 120. Altered data collection engine 145 may identify whether the newly added raw enterprise data is a modified version of raw enterprise data that was previously transmitted to database 146. If the newly added raw enterprise data is a modified version of raw enterprise data that was previously transmitted to database 146, altered data collection engine 145 may transmit the modified raw enterprise data to validation engine 111.

Database 146 may contain raw enterprise data that is generated by the enterprise organization. As discussed in connection with FIG. 1A, the enterprise organization may utilize cloud storage (e.g., multi-cloud environment 140) to store the generated enterprise data. To do so, enterprise organization computing device 120 may transmit the raw enterprise data to multi-cloud environment 140. Enterprise organization computing device 120 may store the raw enterprise data within database 146 of multi-cloud environment 140. Enterprise organization computing device 120 may continuously transmit raw enterprise data to multi-cloud environment 140 such that the entirety of the raw enterprise data generated by the enterprise organization is stored in database 146 of multi-cloud environment 140, as opposed to local storage on physical computing devices within the enterprise organization.

Enterprise organization computing device 120 may be associated with a first level of access (e.g., the least restrictive level of access). As such, enterprise organization computing device 120 may perform actions upon the data within database 146 (e.g., add data, remove data, edit data, re-organize data, or the like). Streaming engine 143, batch collection engine 144, and altered data collection engine 145 may be associated with a second level of access (e.g., a more restrictive level of access than the first level of access). As such, streaming engine 143, batch collection engine 144, and altered data collection engine 145 may perform limited actions upon the data (e.g., may view the data and access the data for transmission to validation engine 111, but might not remove the data, edit the data, re-organize the data, or the like).

Figure 2A:
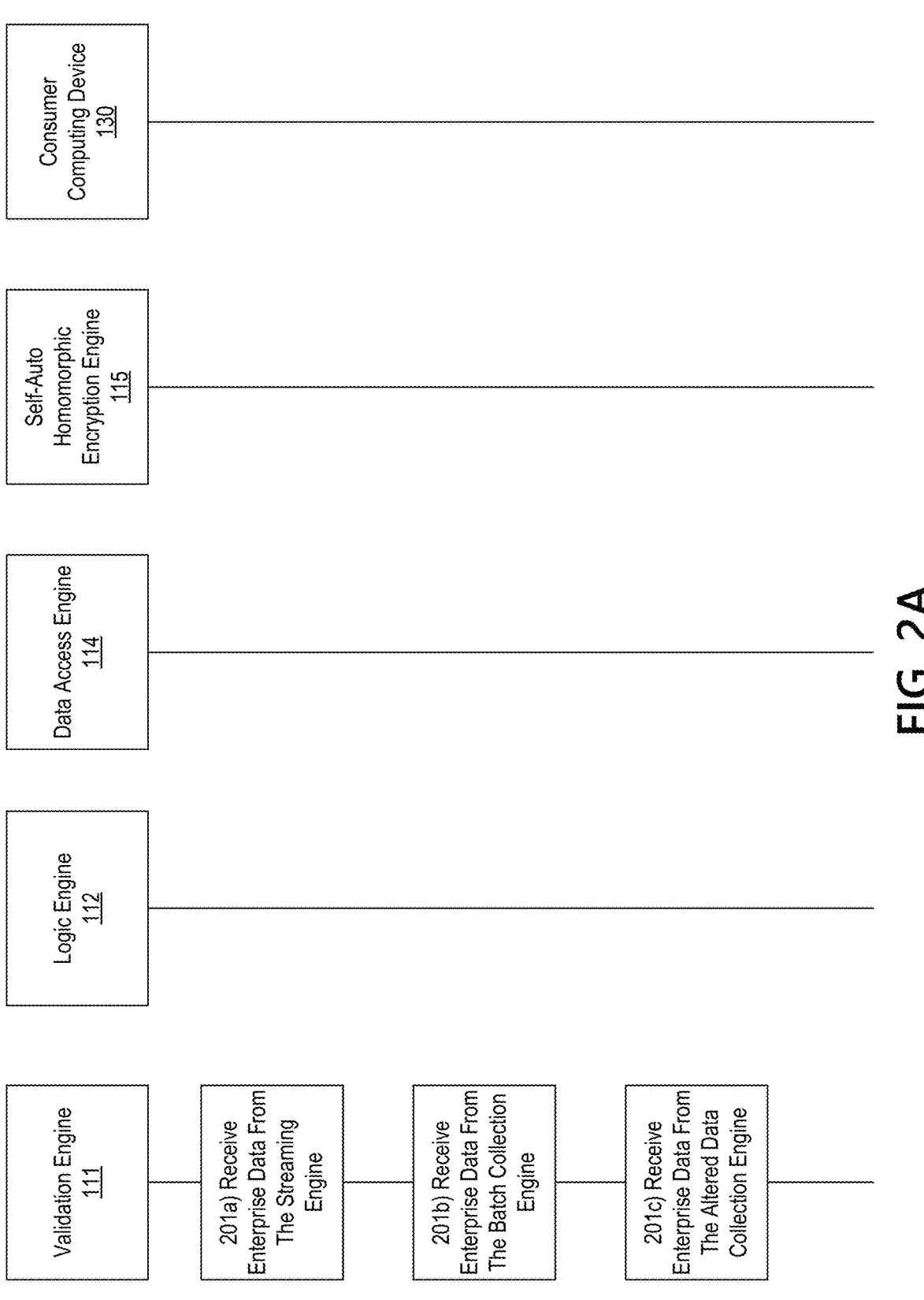
FIGS. 2A-2G depict an illustrative event sequence for using self-automatic homomorphic encryption in a multi-cloud environment to support translytical data computation using an elastic hybrid memory cube in accordance with one or more example embodiments.

Using Automatic Homomorphic Encryption in a Multi-Cloud Environment to Support Translytical Data Computation Using an Elastic Hybrid Memory Cube FIGS. 2A-2G depict an illustrative event sequence for using automatic homomorphic encryption in a multi-cloud environment to support translytical data computation using an elastic hybrid memory cube. One or more aspects described herein may be performed in real-time or near real-time. Referring to FIG. 2A, at step 201, validation engine 111 may receive raw enterprise data from a data collection engine. Each one of streaming engine 143, batch collection engine 144, and altered data collection engine 145 may feature a different method of data collection that may be used to transmit raw enterprise data from the enterprise organization to validation engine 111. Any one of streaming engine 143, batch collecting engine 144, or altered data collection engine 145 may be used to transmit raw enterprise data to validation engine 111.

At step 201a, validation engine 111 may receive enterprise data from streaming engine 143. Streaming engine 143 may communicate with database 146. Database 146 may contain raw enterprise data that is generated by the enterprise organization. As discussed in connection with FIG. 1A, the enterprise organization may utilize cloud storage (e.g., multi-cloud environment 140) to store the enterprise data generated by the enterprise organization. To do so, enterprise organization computing device 120 may continuously transmit the raw enterprise data to multi-cloud environment 140. In particular, enterprise organization computing device 120 may transmit the raw enterprise data to database 146 of multi-cloud environment 140. Enterprise organization computing device 120 may continuously transmit raw enterprise data to database 146 such that the entirety of the raw enterprise data generated by the enterprise organization may be stored in database 146 of multi-cloud environment 140, as opposed to local storage on physical computing devices within the enterprise organization.

The data within database 146 may be raw enterprise data (e.g., enterprise data that has not been processed by validation engine 111 in accordance with the validation criteria). Enterprise organization computing device 120 may continuously transmit raw enterprise data to database 146 as the enterprise organization generates the raw enterprise data.

Streaming engine 143 may access the continuous transmission of raw enterprise data and may transmit the raw enterprise data to validation engine 111.

Additionally or alternatively, at step 201*b*, validation engine 111 may receive enterprise data from batch collection engine 144. Batch collection engine 144 may communicate with database 146 at scheduled intervals (e.g., once per hour, twice per week, four times per month, or the like). At each interval, batch collection engine 144 may retrieve, from database 146, the raw enterprise data that was transmitted to database 146 in the time since the previous retrieval. At each interval, batch collection engine 144 may transmit the retrieved raw enterprise data to validation engine 111.

Additionally or alternatively, at step 201*c*, validation engine 111 may receive enterprise data from altered data collection engine 145. Altered data collection engine 145 may communicate with database 146. Altered data collection engine 145 may continuously monitor the raw enterprise data that is transmitted to database 146 by enterprise organization computing device 120. Altered data collection engine 145 may identify whether the newly added raw enterprise data is a modified version of raw enterprise data that was previously transmitted to database 146. If the newly added raw enterprise data is a modified version of raw enterprise data that was previously transmitted to database 146, altered data collection engine 145 may transmit the modified raw enterprise data to validation engine 111.

Figure 2B:
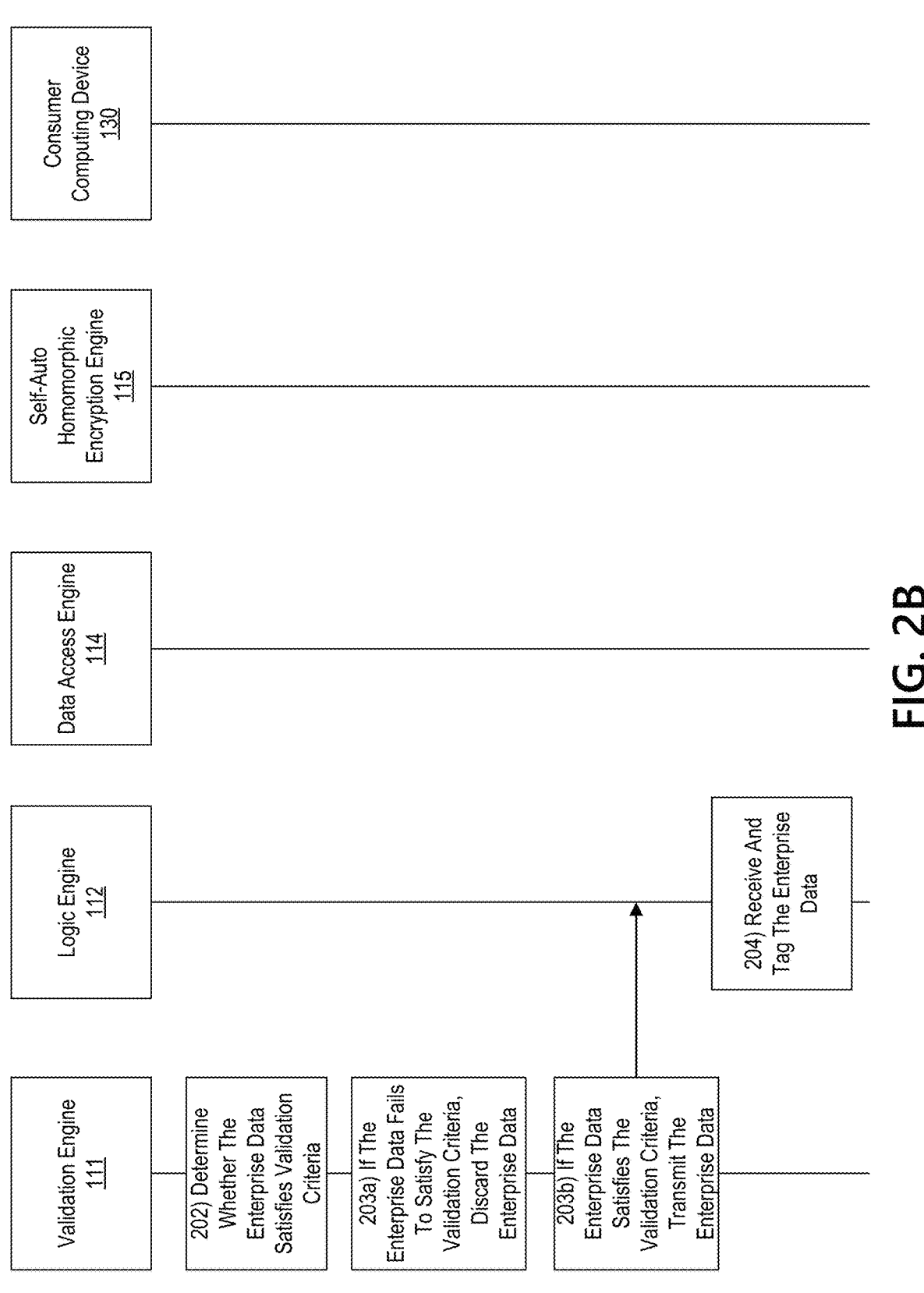

Referring to FIG. 2B, at step 202, validation engine 111 may determine whether the received enterprise data satisfies validation criteria. Enterprise organization computing device 120 may transmit validation criteria to validation engine 111. The validation criteria may indicate criteria for determining whether the enterprise data may proceed to logic engine 112 (e.g., whether the enterprise data is corrupted, whether the enterprise data contains blank data entries, or the like). The enterprise organization may be interested in encrypting only the enterprise data that satisfies the validation criteria (e.g., the enterprise data that is not corrupted, the enterprise data that contains populated data entries, or the like). Over time, the enterprise organization may develop new or additional validation criteria. In such instances, enterprise organization computing device 120 may transmit the new or additional validation criteria to validation engine 111.

For example, the validation criteria may indicate that corrupted data should be removed from the encryption process and should not be transmitted to logic engine 112 for further processing. Validation engine 111 may access and inspect the enterprise data. If validation engine 111 is able to successfully access the enterprise data, then validation engine 111 may determine that the data is fully functional and is not corrupted. Validation engine 111 may transmit the enterprise data to logic engine 112 for further processing prior to encryption. Alternatively, if validation engine 111 receives an error message (e.g., a message indicating that the enterprise data cannot be read) upon attempting to access the enterprise data, validation engine 111 may determine that the enterprise data is corrupted. Validation engine 111 may discard the corrupted enterprise data to ensure that the corrupted enterprise data does not enter the encryption process.

At step 203*a*, validation engine 111 may determine that the enterprise data fails to satisfy the validation criteria. As such, validation engine 111 may discard the enterprise data such that the enterprise data is removed from the encryption process.

Alternatively, at step 203*b*, validation engine 111 may determine that the enterprise data satisfies the validation criteria. As such, validation engine 111 may transmit the enterprise data to logic engine 112 and may store the enterprise data in enterprise data database 117 of elastic hybrid memory cube processor 110. Enterprise data database 117 may contain the enterprise data that satisfies the validation criteria, as determined by validation engine 111, as well as the encrypted enterprise data, generated by self-auto homomorphic encryption engine 115. Self-auto homomorphic encryption engine 115 may be associated with a first level of access (e.g., the least restrictive level of access). As such, self-auto homomorphic encryption engine 115 may perform actions upon the enterprise data within enterprise data database 117 (e.g., add data to the database, update existing data, remove data from the database, re-organize the data within the database, or the like). Validation engine 111 may be associated with a second level of access (e.g., a level of access with modified permissions). As such, validation engine 111 may perform fewer actions upon the enterprise data than the entities associated with the first level of access (e.g., may be permitted to add enterprise data to the database, but might not be permitted to remove, update, or re-organize the existing enterprise data).

At step 204, logic engine 112 may receive the enterprise data that was transmitted from validation engine 111. Logic engine 112 may tag the received enterprise data and may attach encryption rules to the enterprise data. Tagging the enterprise data may comprise attaching an identifier (e.g., a numerical identifier, a keyword, or the like) to the enterprise data. In some instances, logic engine 112 may receive more than one set of enterprise data such that more than one set of enterprise data may undergo the encryption process. Therefore, the identifier may be used to locate each set of enterprise data throughout the encryption process.

For example, logic engine 112 may receive three sets enterprise data from validation engine 111, wherein each set of enterprise data is associated with a different enterprise organization. To locate each set of enterprise data throughout the encryption process, logic engine 112 may assign an identifier to each set of enterprise data. Logic engine 112 may identify the first set of enterprise data as "Data_Set_A," the second set of enterprise data as "Data_Set_B," and the third set of enterprise data as "Data_Set_C." Logic engine 112 may use the identifiers to track and locate each set of enterprise data as each set of enterprise data proceeds through the encryption process.

Logic engine 112 may attach encryption rules to the enterprise data received from validation engine 111. The encryption rules may be attached to the enterprise data as logic engine 112 tags the enterprise data. In particular, logic engine 112 may list each of the encryption rules associated with the enterprise data. In some instances, different sets of enterprise data may be associated with different encryption rules. Therefore, the tag associated with the enterprise data might not only feature the identifier associated with enterprise data, but may identify the encryption rules associated with the enterprise data. Logic engine 112 may receive the encryption rules from enterprise organization computing device 120. The encryption rules may indicate duration and frequency parameters that are associated with the encryption process for the enterprise data (e.g., the duration of the encryption process, the number of iterations associated with the encryption process, the frequency with which public and private key pairs should be generated, or the like). Over time, the enterprise organization may develop new or additional encryption rules. In such instances, logic engine 112 may receive the new or additional encryption rules from enterprise organization computing device 120.

For example, the encryption rules associated with Data_Set_A may indicate that the enterprise data should be continuously encrypted until a new set of enterprise data, generated by the same enterprise organization that generated Data_Set_A, is transmitted to logic engine 112. The encryption rules may further indicate that upon receipt of the new set of enterprise data, Data_Set_A may be transmitted to data access engine 114, wherein consumer computing device 130 may submit a request to access Data_Set_A. The encryption rules associated with Data_Set_A may be different from the encryption rules associated with Data_Set_B. For example, the encryption rules associated with Data_Set_B may indicate that, at most, four public and private key pairs should be generated to encrypt and access Data_Set_B. The encryption rules may further indicate that when the fourth public key has been used to encrypt Data_Set_B, Data_Set_B may be transmitted to data access engine 114, wherein consumer computing device 130 may submit a request to access Data_Set_B. The tag associated with Data_Set_A may reflect the encryption rules associated with Data_Set_A and the tag associated with Data_Set_B may reflect the encryption rules associated with Data_Set_B.

Figure 2C:
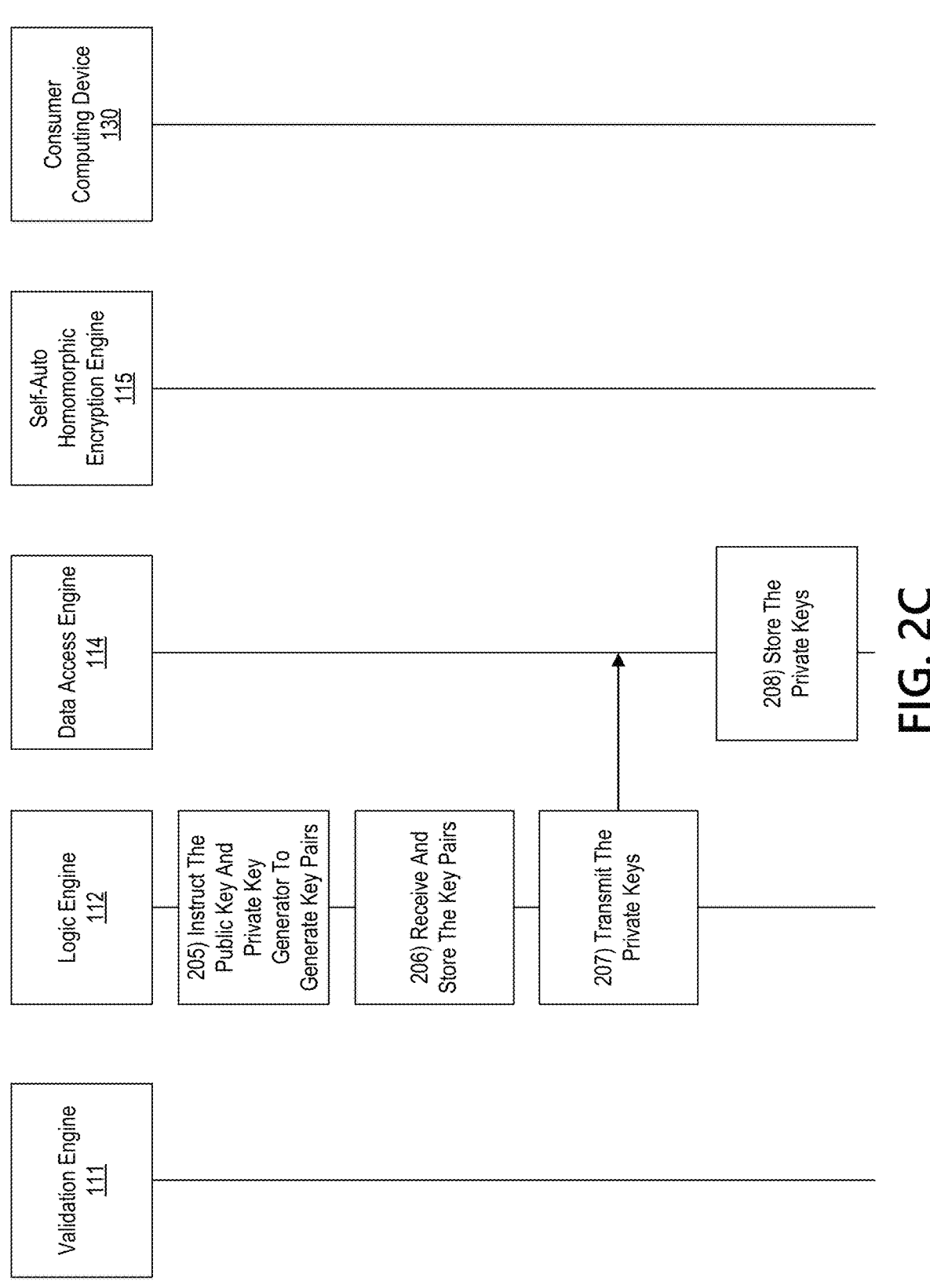

Referring to FIG. 2C, at step 205, logic engine 112 may instruct public key and private key generator 113 to generate public and private key pairs. Logic engine 112 may inspect the encryption rules to determine the number of public keys that may be needed to encrypt the enterprise data as well as the number of corresponding private keys that may be needed to access the encrypted enterprise data. The encryption rules associated with the enterprise data may state the number of public and private key pairs that may be needed. Alternatively, the encryption rules may state the number of iterations of the encryption process that may be used to encrypt the enterprise data. Since each iteration of the encryption process may require a different public key, logic engine 112 may use the number of iterations to determine the number of public and private key pairs that may be needed. Alternatively, the encryption rules may state the duration of the entirety of the encryption process (e.g., continuously encrypt Data_Set_A until a new set of enterprise data, generated by the same enterprise organization that generated Data_Set_A, is transmitted to logic engine 112). In such instances, logic engine 112 may determine a plurality of time intervals (e.g., every hour, every twelve hours, every day, or the like), wherein each time interval indicates a new iteration of the encryption process. Logic engine 112 may use the number of iterations of the encryption process to determine the number of public and private key pairs that may be needed to encrypt the enterprise data.

Logic engine 112 may transmit, to public key and private key generator 113, instructions for determining the number of public and private key pairs that may be needed to encrypt the enterprise data. For example, logic engine 112 may indicate that Data_Set_A may need five public and private key pairs to complete the encryption process, whereas Data_Set_B may need only three public and private key pairs as Data_Set_B may undergo only three iterations of the encryption process. Logic engine 112 may indicate that Data_Set_C may undergo a six-hour encryption process, and may instruct public key and private key generator 113 to continuously generate public and private key pairs throughout the six-hour encryption process.

Public key and private key generator 113 may receive instructions from logic engine 112 and may use the instructions to generate public and private key pairs that may be needed to encrypt the enterprise data and access the encrypted enterprise data. Public key and private key generator 113 may transmit the generated public and private key pairs to logic engine 112.

At step 206, logic engine 112 may receive the public and private key pairs generated by public key and private key generator 113. Logic engine 112 may store the public and private key pairs in public key and private key database 118. Public key and private key database 118 may contain the public and private key pairs generated by public key and private key generator 113. Public key and private key generator 113 may be associated with a first level of access (e.g., the least restrictive level of access). As such, public key and private key generator 113 may perform actions upon the data within public key and private key database 118 (e.g., add data, remove data, update data, re-organize data, or the like). Data access engine 114 and self-auto homomorphic encryption engine 115 may be associated with a second level of access (e.g., the more restrictive level of access than the first level of access). As such, data access engine 114 and self-auto homomorphic encryption engine 115 may perform limited actions upon the enterprise data (e.g., may only be permitted to view the data).

At step 207, logic engine 112 may transmit the private keys to data access engine 114. As discussed in steps 219 to 221, data access engine 114 may use the private keys to determine whether consumer computing device 130 is authorized to access the encrypted enterprise data. Therefore, in step 208, data access engine 114 may store the private keys so that data access engine 114 may reference the private keys as needed.

Figure 2D:
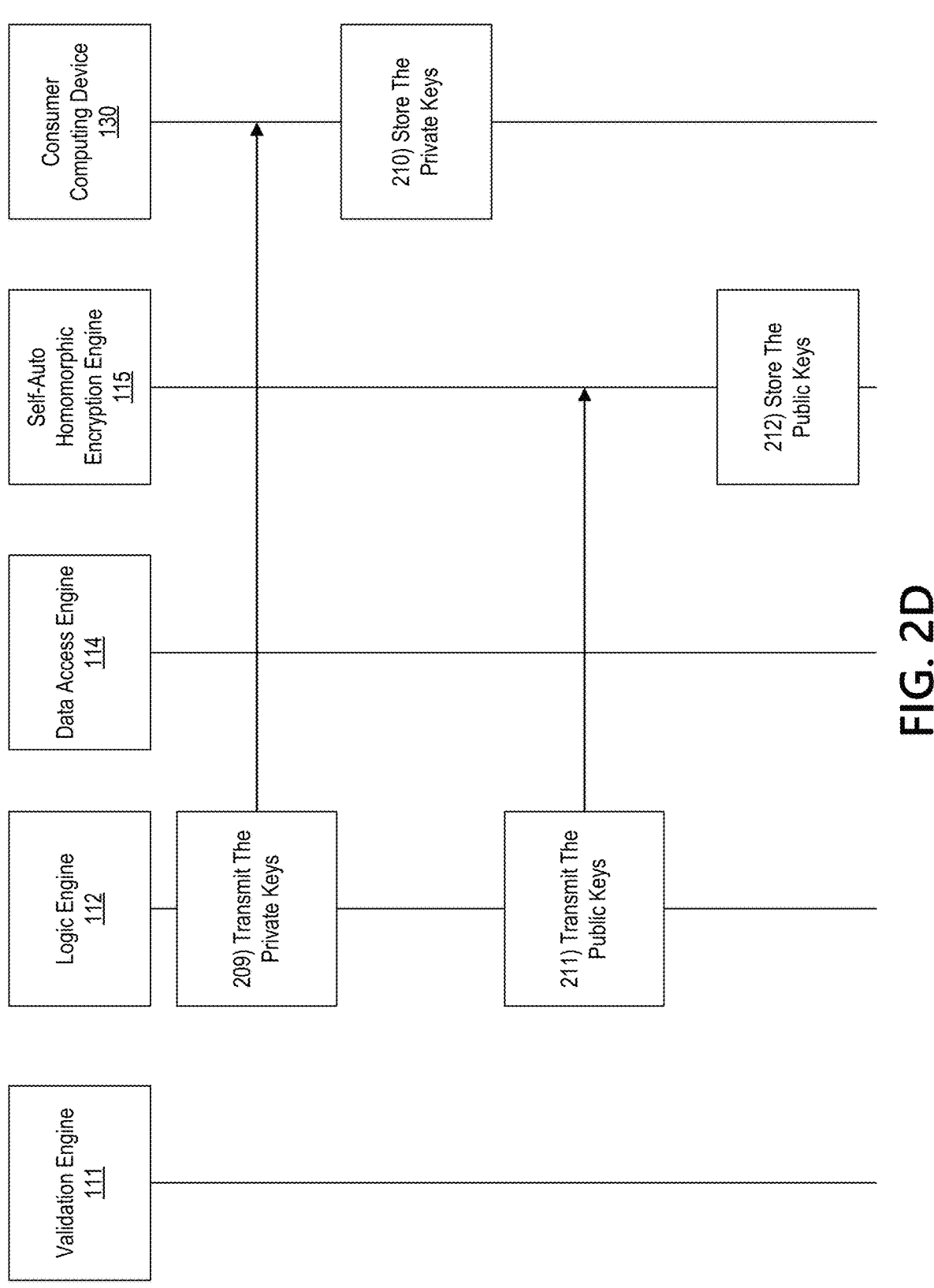

Referring to FIG. 2D, at step 209, logic engine 112 may transmit the private keys to consumer computing device 130. As discussed in step 219, consumer computing device 130 may use the private keys to request access to the encrypted enterprise data. Therefore, in step 210, consumer computing device 130 may store the private keys so that consumer computing device 130 may use the private keys when transmitting data access requests.

At step 211, logic engine 112 may transmit the public keys to self-auto homomorphic encryption engine 115. As discussed in detail in step 216, self-auto homomorphic encryption engine 115 may use the public keys to encrypt the enterprise data. Therefore, in step 212, self-auto homomorphic encryption engine 115 may store the public keys.

Figure 2E:
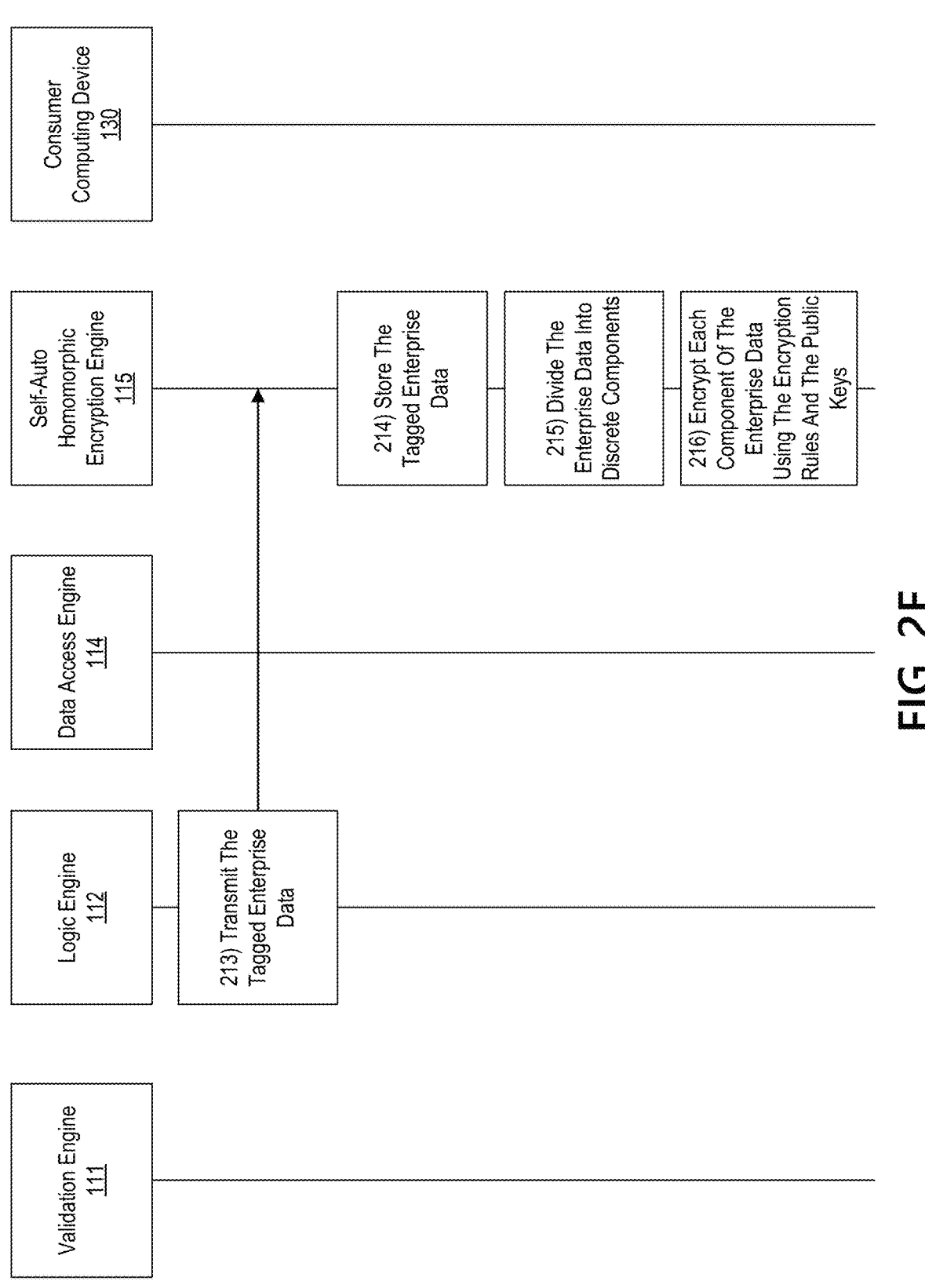

Referring to FIG. 2E, at step 213, logic engine 112 may transmit the tagged enterprise data to self-auto homomorphic encryption engine 115. As discussed in step 204, tagged enterprise data may contain an identifier associated with the enterprise data as well as encryption rules associated with the enterprise data. As discussed in detail in step 216, self-auto homomorphic encryption engine 115 may initiate the encryption process using the enterprise data and the encryption rules. Therefore, in step 214, self-auto homomorphic encryption engine 115 may store the tagged enterprise data.

At step 215, self-auto homomorphic encryption engine 115 may divide the enterprise data into discrete components. While each discrete component of the enterprise data may be encrypted individually, each discrete component may be encrypted using the same public key. Using the identifier associated with the enterprise data, self-auto homomorphic encryption engine 115 may maintain the relationship between the discrete components of the enterprise data. Self-auto homomorphic encryption engine 115 may divide the enterprise data into discrete components to further protect the enterprise data against access by unauthorized entities. If an unauthorized entity successfully gains access to a discrete component of the enterprise data, the single discrete component might not be sufficient to understand the enterprise data in its entirety. In isolation and without the context of the surrounding components, it may be difficult to identify the significance of a discrete component.

For example, enterprise data generated by a financial institution may indicate a plurality of account numbers, the entity associated with each account, and the principal amount within each account. Self-auto homomorphic encryption engine 115 may divide the enterprise data such that each account number, each entity, and each amount is contained within a discrete component (e.g., a first component may indicate an account number as "XXXXX," a second component may indicate an entity associated with an account as "LastName, FirstName," a third component may indicate that the principal amount in account number XXXXX is "$100," or the like). The information provided by the first component might not be significant when compared to the information provided by a combination of the first, second, and third components. Therefore, dividing the enterprise data into discrete components may reduce the likelihood of an unauthorized entity gaining access to the entirety of the enterprise data.

At step 216, self-auto homomorphic encryption engine 115 may encrypt each discrete component of the enterprise data. To do so, self-auto homomorphic encryption engine 115 may refer to the encryption rules associated with the enterprise data. The encryption rules may indicate duration and frequency parameters that are associated with the encryption process for the enterprise data (e.g., the duration of the encryption process, the number of iterations associated with the encryption process, the frequency with which public and private key pairs should be generated, or the like). Self-auto homomorphic encryption engine 115 may access the public keys, received from logic engine 112 in step 211, associated with the enterprise data. Using the public keys, self-auto homomorphic encryption engine 115 may encrypt each component of the enterprise data in accordance with the encryption rules associated with the enterprise data.

For example, the encryption rules associated with Data_Set_A may indicate that the enterprise data should be continuously encrypted until a new set of enterprise data, generated by the same enterprise organization that generated Data_Set_A, is transmitted to logic engine 112. The encryption rules may further indicate that upon receipt of the new set of enterprise data, Data_Set_A may be transmitted to data access engine 114, wherein consumer computing device 130 may submit a request to access Data_Set_A. Self-auto homomorphic encryption engine 115 may use the first public key, generated by public key and private key generator 113, to encrypt each discrete component of Data_Set_A. When each discrete component of Data_Set_A has been encrypted using the first public key, self-auto homomorphic encryption engine 115 may proceed to the next iteration of the encryption process (e.g., using the next public key to encrypt each discrete component of Data_Set_A). Self-auto homomorphic encryption engine 115 may continue encrypting each discrete component of Data_Set_A until a new set of enterprise data is received. In accordance with the encryption rules associated with Data_Set_A, self-auto homomorphic encryption engine 115 may cease the encryption process when a new set of enterprise data is received.

Figure 2F:
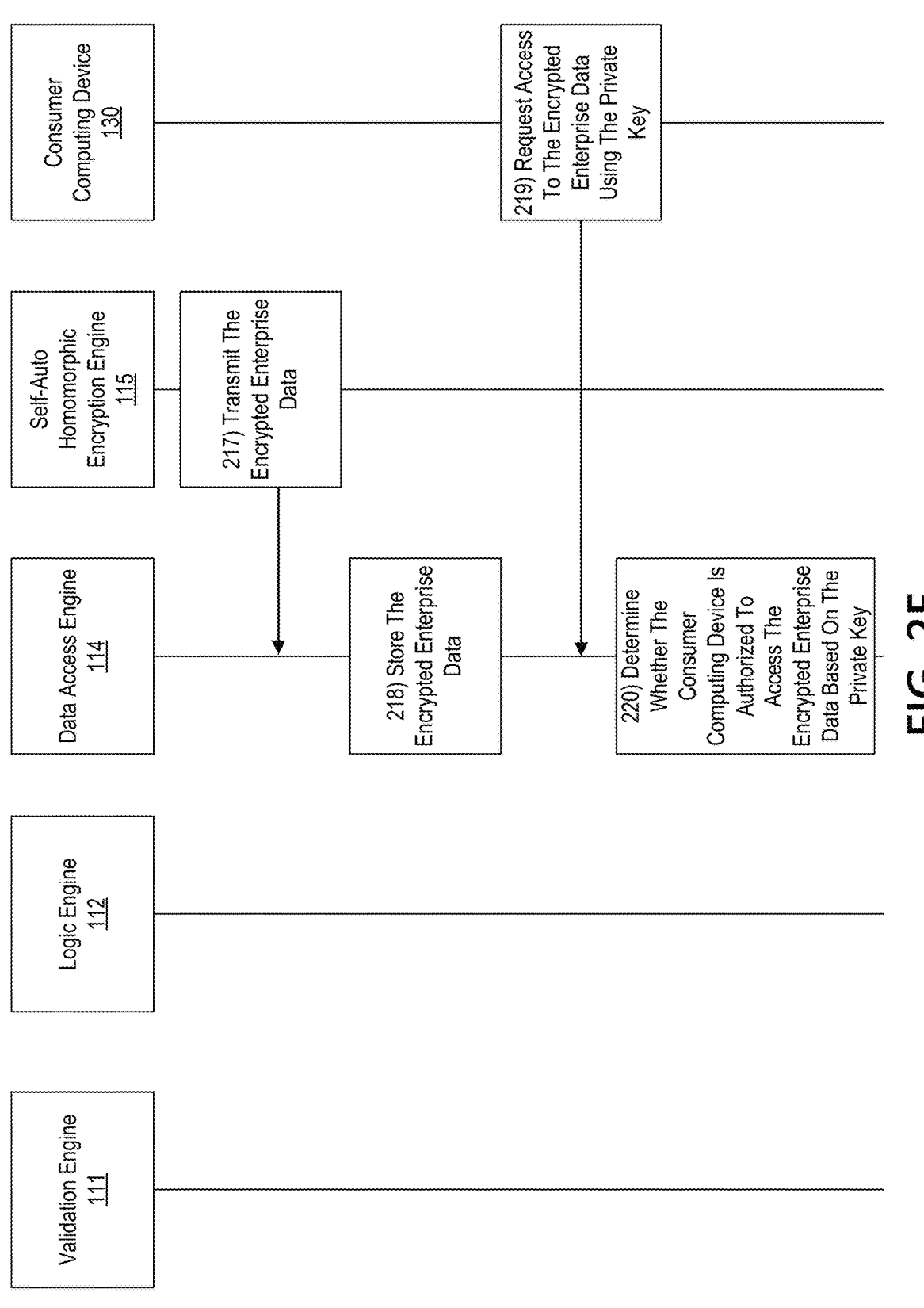

Referring to FIG. 2F, at step 217, self-auto homomorphic encryption engine 115 may transmit the encrypted enterprise data to data access engine 114. As discussed in step 219, data access engine 114 may receive, from consumer computing device 130, a request to access the encrypted enterprise data. Therefore, at step 218, data access engine 114 may store the encrypted enterprise data.

At step 219, consumer computing device 130 may transmit, to data access engine 114, a request to access the encrypted enterprise data. The request from consumer computing device 130 may contain a private key received by consumer computing device 130 and from logic engine 112, as discussed in steps 209 and 210. In particular, the request from consumer computing device 130 may contain the private key that was most recently transmitted from logic engine 112 to consumer computing device 130. Each iteration of the encryption process may use a different public key than the public key used in previous iterations, and each public key may be associated with a corresponding private key. The most recently transmitted private key may correspond to the most recently used public key (e.g., the most recent public key that was used to encrypt the enterprise data).

The request for access to the encrypted enterprise data may further contain a description of the enterprise data to which consumer computing device 130 is requesting access (e.g., the name of the enterprise organization that generated the enterprise data, the date that the enterprise data was generated, the date that the enterprise data was transmitted to multi-cloud environment 140, authorization credentials associated with accessing the enterprise data, or the like).

For example, consumer computing device 130 may request access to enterprise data generated by a financial institution. The request may indicate the name of the financial institution as "Institution_1," the data of creation of the enterprise data as "XX/XX/XXXX," the date of transmission of the enterprise data as "ZZ/ZZ/ZZZZ," and the private key associated with the enterprise data as "AABBCCDD." Consumer computing device 130 may transmit the request to data access engine 114.

At step 220, data access engine 114 may determine whether consumer computing device 130 is authorized to access the encrypted enterprise data. To do so, data access engine 114 may compare the private key indicated in the request to the private keys that were transmitted from logic engine 112 to data access engine 114. The private keys that were transmitted from logic engine 112 to data access engine 114 may correspond to the public keys that self-auto homomorphic encryption engine 115 may use to encrypt the enterprise data. In particular, the order of the private keys may correspond to the order of the public keys that were used to encrypt the enterprise data. The most recently received private key may correspond to the public key that was most recently used to encrypt the enterprise data.

If the private key in the request matches the private key that corresponds to the public key that was most recently used to encrypt the enterprise data, then data access engine 114 may determine that consumer computing device 130 successfully received the most recently used private key and, as such, is authorized to access the encrypted enterprise data. Alternatively, if the private key in the request fails to match the private key that corresponds to the public key that was most recently used to encrypt the enterprise data, then data access engine 114 may determine that consumer computing device 130 did not receive the most recently used private key and, as such, is not authorized to access the encrypted enterprise data.

Figure 2G:
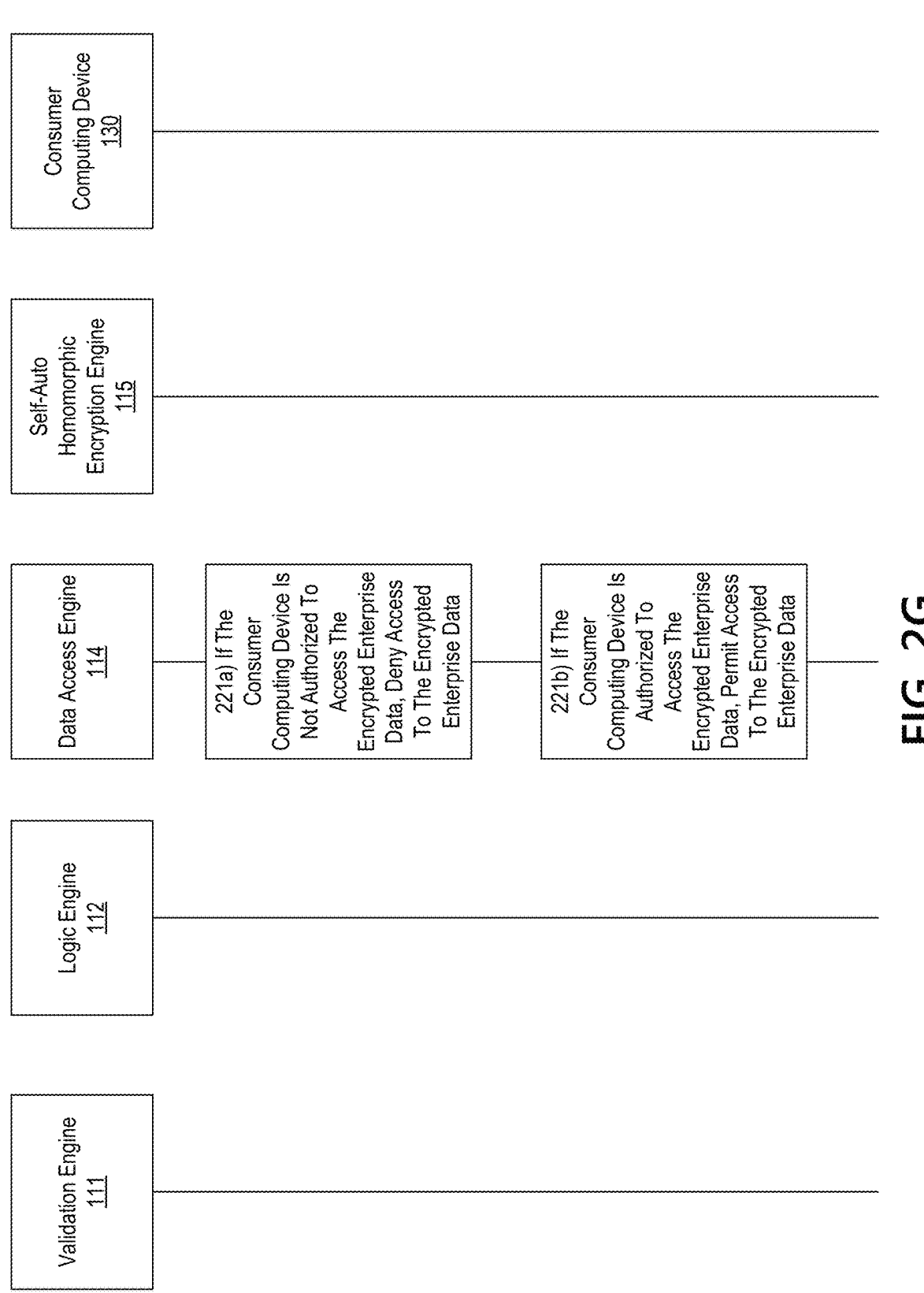

Referring to FIG. 2G, at step 221a, data access engine 114 may determine that the private key in the request fails to match the private key that corresponds to the public key that was most recently used to encrypt the enterprise data. Data access engine 114 may determine that consumer computing device 130 did not receive the most recently used private key and, as such, is not authorized to access the encrypted enterprise data. Consequently, data access engine 114 may transmit a notification to consumer computing device 130 indicating denial of the request to access the encrypted enterprise data.

Alternatively, at step 221*b*, data access engine 114 may determine that the private key in the request matches the private key that corresponds to the public key that was most recently used to encrypt the enterprise data. Data access engine 114 may determine that consumer computing device 130 successfully received the most recently used private key and, as such, is authorized to access the encrypted enterprise data. Therefore, data access engine 114 may transmit a notification to consumer computing device 130 indicating approval of the request to access the encrypted enterprise data.

Figure 3:
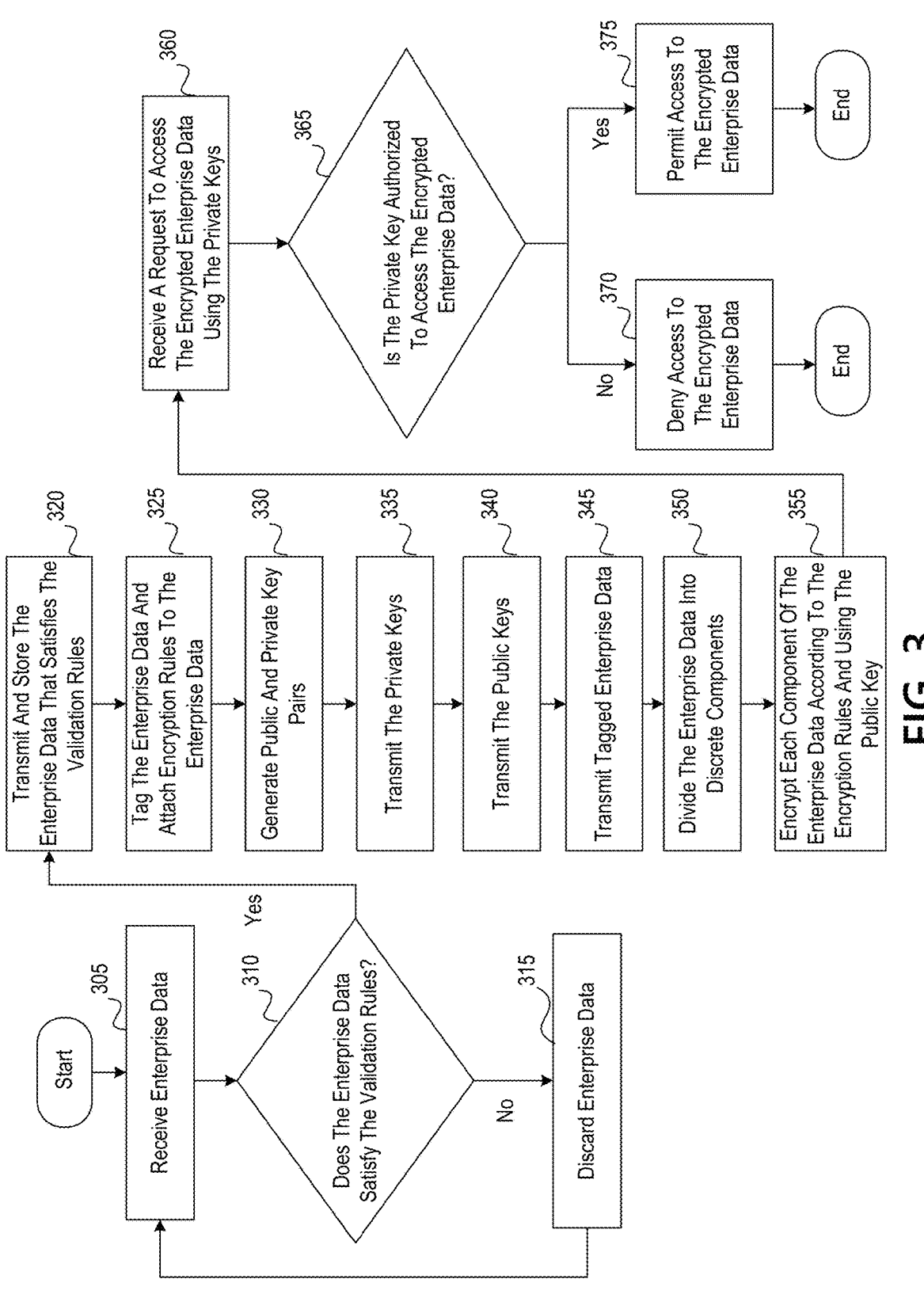
FIG. 3 depicts an illustrative method for using self-automatic homomorphic encryption in a multi-cloud environment to support translytical data computation using an elastic hybrid memory cube in accordance with one or more example embodiments.

FIG. 3 depicts a flow diagram illustrating one example method for using automatic homomorphic encryption in a multi-cloud environment to support translytical data computation using an elastic hybrid memory cube in accordance with one or more aspects described herein. The processes illustrated in FIG. 3 are merely sample processes and functions. The steps shown may be performed in the order shown, in a different order, more steps may be added, or one or more steps may be omitted, without departing from the invention. In some examples, one or more steps may be performed simultaneously with other steps shown and described. Further, one or more steps described with respect to FIG. 3 may be performed in real-time or near real-time.

At step 305, validation engine 111 may receive raw enterprise data from a data collection engine. Each one of streaming engine 143, batch collection engine 144, and altered data collection engine 145 may feature a different method of data collection that may be used to transmit raw enterprise data from the enterprise organization to validation engine 111. Any one of streaming engine 143, batch collecting engine 144, or altered data collection engine 145 may be used to transmit raw enterprise data to validation engine 111.

Streaming engine 143 may communicate with database 146. Database 146 may contain raw enterprise data that is generated by the enterprise organization. The enterprise organization may utilize cloud storage (e.g., multi-cloud environment 140) to store the enterprise data generated by the enterprise organization. To do so, enterprise organization computing device 120 may continuously transmit the raw enterprise data to database 146 of multi-cloud environment 140 such that the entirety of the raw enterprise data generated by the enterprise organization may be stored in database 146 of multi-cloud environment 140, as opposed to local storage on physical computing devices within the enterprise organization. Enterprise organization computing device 120 may continuously transmit raw enterprise data to database 146 as the enterprise organization generates the raw enterprise data. Streaming engine 143 may access the continuous transmission of raw enterprise data and may transmit the raw enterprise data to validation engine 111.

Additionally or alternatively, validation engine 111 may receive enterprise data from batch collection engine 144. Batch collection engine 144 may communicate with database 146 at scheduled intervals (e.g., once per hour, twice per week, four times per month, or the like). At each interval, batch collection engine 144 may retrieve, from database 146, the raw enterprise data that was transmitted to database 146 in the time since the previous retrieval. At each interval, batch collection engine 144 may transmit the retrieved raw enterprise data to validation engine 111.

Additionally or alternatively, validation engine 111 may receive enterprise data from altered data collection engine 145. Altered data collection engine 145 may communicate with database 146. Altered data collection engine 145 may continuously monitor the raw enterprise data that is transmitted to database 146 by enterprise organization computing device 120. Altered data collection engine 145 may identify whether the newly added raw enterprise data is a modified version of raw enterprise data that was previously transmitted to database 146. If the newly added raw enterprise data is a modified version of raw enterprise data that was previously transmitted to database 146, altered data collection engine 145 may transmit the modified raw enterprise data to validation engine 111.

At step 310, validation engine 111 may determine whether the received enterprise data satisfies validation criteria. Enterprise organization computing device 120 may transmit validation criteria to validation engine 111. The validation criteria may indicate criteria for determining whether the enterprise data may proceed to logic engine 112 (e.g., whether the enterprise data is corrupted, whether the enterprise data contains blank data entries, or the like). The enterprise organization may be interested in encrypting only the enterprise data that satisfies the validation criteria (e.g., the enterprise data that is not corrupted, the enterprise data that contains populated data entries, or the like). Over time, the enterprise organization may develop new or additional validation criteria. In such instances, enterprise organization computing device 120 may transmit the new or additional validation criteria to validation engine 111.

At step 315, validation engine 111 may determine that the enterprise data fails to satisfy the validation criteria. As such, validation engine 111 may discard the enterprise data such that the enterprise data is removed from the encryption process. If the enterprise data is removed from the encryption process, the encryption process may return to step 305.

If, at step 310, validation engine 111 determines that the enterprise data satisfies the validation criteria, then, at step 320, validation engine 111 may transmit the enterprise data to logic engine 112 and may store the enterprise data in enterprise data database 117 of elastic hybrid memory cube processor 110. Enterprise data database 117 may contain the enterprise data that satisfies the validation criteria, as determined by validation engine 111, as well as the encrypted enterprise data, generated by self-auto homomorphic encryption engine 115. Self-auto homomorphic encryption engine 115 may be associated with a first level of access (e.g., the least restrictive level of access). As such, self-auto homomorphic encryption engine 115 may perform actions upon the enterprise data within enterprise data database 117 (e.g., add data to the database, update existing data, remove data from the database, re-organize the data within the database, or the like). Validation engine 111 may be associated with a second level of access (e.g., the level of access with modified permissions). As such, validation engine 111 may perform fewer actions upon the enterprise data than the entities associated with the first level of access (e.g., may be permitted to add enterprise data to the database, but might not be permitted to remove, update, or re-organize the existing enterprise data).

At step 325, logic engine 112 may tag the received enterprise data and may attach encryption rules to the enterprise data. Tagging the enterprise data may comprise attaching an identifier (e.g., a numerical identifier, a keyword, or the like) to the enterprise data. In some instances, logic engine 112 may receive more than one set of enterprise data such that more than one set of enterprise data may undergo the encryption process. Therefore, the identifier may be used to locate each set of enterprise data throughout the encryption process.

Logic engine 112 may attach encryption rules to the enterprise data received from validation engine 111. The encryption rules may be attached to the enterprise data as logic engine 112 tags the enterprise data. In particular, logic engine 112 may list each of the encryption rules associated with the enterprise data. In some instances, different sets of enterprise data may be associated with different encryption rules. Therefore, the tag associated with the enterprise data may not only feature the identifier associated with enterprise data, but may identify the encryption rules associated with the enterprise data. Logic engine 112 may receive the encryption rules from enterprise organization computing device 120. The encryption rules may indicate duration and frequency parameters that are associated with the encryption process for the enterprise data (e.g., the duration of the encryption process, the number of iterations associated with the encryption process, the frequency with which public and private key pairs should be generated, or the like). Over time, the enterprise organization may develop new or additional encryption rules. In such instances, logic engine 112 may receive the new or additional encryption rules from enterprise organization computing device 120.

At step 330, public key and private key generator 113 may receive instructions from logic engine 112 and may use the instructions to generate public and private key pairs that may be needed to encrypt the enterprise data and access the encrypted enterprise data. For instance, logic engine 112 may instruct public key and private key generator 113 to generate public and private key pairs. To determine the quantity of public and private key pairs that may be needed throughout the encryption process, logic engine 112 may inspect the encryption rules (e.g., determine the number of public keys that may be needed to encrypt the enterprise data as well as the number of corresponding private keys that may be needed to access the encrypted enterprise data). The encryption rules associated with the enterprise data may state the number of public and private key pairs that may be needed. Additionally or alternatively, the encryption rules may state the number of iterations of the encryption process that may be used to encrypt the enterprise data. Since each iteration of the encryption process may require a different public key, logic engine 112 may use the number of iterations to determine the number of public and private key pairs that may be needed. Additionally or alternatively, the encryption rules may state the duration of the entirety of the encryption process (e.g., continuously encrypt Data_Set_A until a new set of enterprise data, generated by the same enterprise organization that generated Data_Set_A, is transmitted to logic engine 112). In such instances, logic engine 112 may determine a plurality of time intervals (e.g., every hour, every twelve hours, every day, or the like), wherein each time interval indicates a new iteration of the encryption process. Logic engine 112 may use the number of iterations of the encryption process to determine the number of public and private key pairs that may be needed to encrypt the enterprise data. Logic engine 112 may transmit, to public key and private key generator 113, instructions for determining the number of public and private key pairs that may be needed to encrypt the enterprise data.

Public key and private key generator 113 may transmit the generated public and private key pairs to logic engine 112. Logic engine 112 may store the public and private key pairs in public key and private key database 118. Public key and private key database 118 may contain the public and private key pairs generated by public key and private key generator 113. Public key and private key generator 113 may be associated with a first level of access (e.g., the least restrictive level of access). As such, public key and private key generator 113 may perform actions upon the data within public key and private key database 118 (e.g., add data, remove data, update data, re-organize data, or the like). Data access engine 114 and self-auto homomorphic encryption engine 115 may be associated with a second level of access (e.g., the most restrictive level of access). As such, data access engine 114 and self-auto homomorphic encryption engine 115 may perform limited actions upon the enterprise data (e.g., may only be permitted to view the data).

At step 335, logic engine 112 may transmit the private keys to consumer computing device 130 and data access engine 114. Consumer computing device 130 may use the private keys to request access to the encrypted enterprise data. Data access engine 114 may use the private keys to determine whether consumer computing device 130 is authorized to access the encrypted enterprise data.

At step 340, logic engine 112 may transmit the public keys to self-auto homomorphic encryption engine 115. Self-auto homomorphic encryption engine 115 may use the public keys to encrypt the enterprise data.

At step 345, logic engine 112 may transmit the tagged enterprise data to self-auto homomorphic encryption engine 115. The tagged enterprise data may contain an identifier associated with the enterprise data as well as encryption rules associated with the enterprise data. Self-auto homomorphic encryption engine 115 may initiate the encryption process using the enterprise data and the encryption rules.

At step 350, self-auto homomorphic encryption engine 115 may divide the enterprise data into discrete components. While each discrete component of the enterprise data may be encrypted individually, each discrete component may be encrypted using the same public key. Using the identifier associated with the enterprise data, self-auto homomorphic encryption engine 115 may maintain the relationship between the discrete components of the enterprise data. Self-auto homomorphic encryption engine 115 may divide the enterprise data into discrete components to further protect the enterprise data against access by unauthorized entities. If an unauthorized entity successfully gains access to a discrete component of the enterprise data, the single discrete component might not be sufficient to understand the enterprise data in its entirety. In isolation and without the context of the surrounding components, it may be difficult to identify the significance of a discrete component.

At step 355, self-auto homomorphic encryption engine 115 may encrypt each discrete component of the enterprise data. To do so, self-auto homomorphic encryption engine 115 may refer to the encryption rules associated with the enterprise data. The encryption rules may indicate duration and frequency parameters that are associated with the encryption process for the enterprise data (e.g., the duration of the encryption process, the number of iterations associated with the encryption process, the frequency with which public and private key pairs should be generated, or the like). Self-auto homomorphic encryption engine 115 may access the public keys, received from logic engine 112 in step 340, associated with the enterprise data. Using the public keys, self-auto homomorphic encryption engine 115 may encrypt each component of the enterprise data in accordance with the encryption rules associated with the enterprise data.

Self-auto homomorphic encryption engine 115 may transmit the encrypted enterprise data to data access engine 114. Data access engine 114 may receive, from consumer computing device 130, a request to access the encrypted enterprise data and, as such, may store the encrypted enterprise data.

At step 360, data access engine 114 may receive, from consumer computing device 130, a request to access the encrypted enterprise data. The request from consumer computing device 130 may contain a private key received by consumer computing device 130 and from logic engine 112, as discussed in step 335. In particular, the request from consumer computing device 130 may contain the private key that was most recently transmitted from logic engine 112 to consumer computing device 130. Each iteration of the encryption process may use a different public key than the public key used in previous iterations, and each public key may be associated with a corresponding private key. The most recently transmitted private key may correspond to the most recently used public key (e.g., the most recent public key that was used to encrypt the enterprise data).

The request for access to the encrypted enterprise data may further contain a description of the enterprise data to which consumer computing device 130 is requesting access (e.g., the name of the enterprise organization that generated the enterprise data, the date that the enterprise data was generated, the date that the enterprise data was transmitted to multi-cloud environment 140, authorization credentials associated with accessing the enterprise data, or the like).

At step 365, data access engine 114 may determine whether the private key indicated on the request is authorized to access the encrypted enterprise data. To do so, data access engine 114 may compare the private key indicated in the request to the private keys that were transmitted from logic engine 112 to data access engine 114. The private keys that were transmitted from logic engine 112 to data access engine 114 may correspond to the public keys that self-auto homomorphic encryption engine 115 may use to encrypt the enterprise data. In particular, the order of the private keys may correspond to the order of the public keys that were used to encrypt the enterprise data. The most recently received private key may correspond to the public key that was most recently used to encrypt the enterprise data.

If, at step 365, the private key in the request fails to match the private key that corresponds to the public key that was most recently used to encrypt the enterprise data, then data access engine 114 may determine that consumer computing device 130 is not authorized to access the encrypted enterprise data at step 370. For instance, data access engine 114 may determine that the private key in the request fails to match the private key that corresponds to the public key that was most recently used to encrypt the enterprise data. Data access engine 114 may determine that consumer computing device 130 is not authorized to access the encrypted enterprise data. Consequently, data access engine 114 may transmit a notification to consumer computing device 130 indicating denial of the request to access the encrypted enterprise data.

Alternatively, if, at step 365, the private key in the request matches the private key that corresponds to the public key that was most recently used to encrypt the enterprise data, then data access engine 114 may determine that consumer computing device 130 is authorized to access the encrypted enterprise data at step 375. For instance, data access engine 114 may determine that the private key in the request matches the private key that corresponds to the public key that was most recently used to encrypt the enterprise data.

Data access engine 114 may determine that consumer computing device 130 is authorized to access the encrypted enterprise data. Therefore, data access engine 114 may transmit a notification to consumer computing device 130 indicating approval of the request to access the encrypted enterprise data.

Aspects described herein provide real-time, or near real-time, continuous encryption of enterprise data. Accordingly, the aspects described may permit an enterprise organization to transmit enterprise data from the enterprise organization to a self-auto homomorphic encryption engine, wherein the enterprise data may immediately undergo encryption processing. Further, arrangements described herein may permit the enterprise data associated with the enterprise organization to experience continuous encryption using a plurality of public keys, thereby increasing the level of data protection surrounding the enterprise data.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an enterprise computing platform, or as one or more non-transitory computer-readable media storing instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space).

As described herein, the various methods and acts may be operative across one or more computing servers and one or more networks. The functionality may be distributed in any manner, or may be located in a single computing device (e.g., a server, a consumer computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A method comprising:

at a computing device configured to operate within a multi-cloud environment and including a hybrid memory cube processor, at least one or more additional processors, and memory:

determining, by a validation engine, whether enterprise data associated with an enterprise organization satisfies validation criteria;

based on the enterprise data satisfying the validation criteria, dividing, by a self-auto homomorphic encryption engine, the enterprise data into discrete components;

generating, by a logic engine, a plurality of public keys and plurality of private keys;

transmitting, to the self-auto homomorphic encryption engine, the plurality of public keys, wherein each public key is used to encrypt the discrete components of the enterprise data;

encrypting, by the self-auto homomorphic encryption engine, the discrete components of the enterprise data according to a plurality of encryption rules and using a public key of the plurality of public keys;

transmitting, by the self-auto homomorphic encryption engine, encrypted enterprise data to a data access engine;

transmitting, to the enterprise organization, the plurality of private keys, wherein a most recently created private key of the plurality of private keys is used to access, by the enterprise organization, the encrypted enterprise data;

receiving, by the data access engine and from the enterprise organization, a request to access the encrypted enterprise data using a private key of the plurality of private keys; and transmitting a notification, wherein the notification indicates one of:

approval of the request to access the encrypted enterprise data; or denial of the request to access the encrypted enterprise data.

2. The method of claim 1, further comprising transmitting, by a batch collection engine and to the validation engine, a collection of enterprise data, associated with the enterprise organization, collected over a period of time.

3. The method of claim 1, further comprising transmitting, by an altered data collection engine and to the validation engine, the enterprise data, associated with the enterprise organization, that has been altered by the enterprise organization over a period of time.

4. The method of claim 1, further comprising transmitting, by a streaming engine and to the validation engine, the enterprise data associated with the enterprise organization.

5. The method of claim 1, wherein the transmitting the notification indicating approval of the request to access the encrypted enterprise data comprises:

comparing, by the data access engine, the private key to the most recently created private key; and determining, by the data access engine, that the private key matches the most recently created private key.

6. The method of claim 1, wherein encrypting, by the self-auto homomorphic encryption engine, the discrete components of the enterprise data is performed continuously.

7. The method of claim 1, further comprising maintaining, by the logic engine, a relationship between the discrete components of the enterprise data.

8. A computing platform comprising:

a hybrid memory cube processor;

at least one additional processor;

a communication interface communicatively coupled to the at least one additional processor; and memory storing computer-readable instructions that, when executed by the hybrid memory cube processor and the at least one additional processor, cause the computing platform to:

determine, by a validation engine, whether enterprise data associated with an enterprise organization satisfies validation criteria;

based on the enterprise data satisfying the validation criteria, divide, by a self-auto homomorphic encryption engine, the enterprise data into discrete components;

generate, by a logic engine, a plurality of public keys and plurality of private keys;

transmit, to the self-auto homomorphic encryption engine, the plurality of public keys, wherein each public key is used to encrypt the discrete components of the enterprise data;

encrypt, by the self-auto homomorphic encryption engine, the discrete components of the enterprise data according to a plurality of encryption rules and using a public key of the plurality of public keys;

transmit, by the self-auto homomorphic encryption engine, encrypted enterprise data to a data access engine;

transmit, to the enterprise organization, the plurality of private keys, wherein a most recently created private key of the plurality of private keys is used to access, by the enterprise organization, the encrypted enterprise data;

receive, by the data access engine and from the enterprise organization, a request to access the encrypted enterprise data using a private key of the plurality of private keys; and transmit a notification, wherein the notification indicates one of:

approval of the request to access the encrypted enterprise data; or denial of the request to access the encrypted enterprise data.

9. The computing platform of claim 8, wherein the instructions, when executed, further cause the computing platform to transmit, by a batch collection engine and to the validation engine, a collection of enterprise data, associated with the enterprise organization, collected over a period of time.

10. The computing platform of claim 8, wherein the instructions, when executed, further cause the computing platform to transmit, by an altered data collection engine and to the validation engine, the enterprise data, associated with the enterprise organization, that has been altered by the enterprise organization over a period of time.

11. The computing platform of claim 8, further including instructions that, when executed, cause the computing platform to transmit, by a streaming engine and to the validation engine, the enterprise data associated with the enterprise organization.

12. The computing platform of claim 8, wherein the instructions, when executed, further cause the computing platform to:

> generate, by a logic engine, the plurality of public keys and the plurality of private keys;
>
> transmit, to the self-auto homomorphic encryption engine and from the logic engine, the plurality of public keys, wherein each public key is used to encrypt the discrete components of the enterprise data; and
>
> transmit, to the data access engine and the enterprise organization, and from the logic engine, the plurality of private keys, wherein a most recently created private key of the plurality of private keys is used to access, by the enterprise organization, the encrypted enterprise data.

13. The computing platform of claim 8, wherein the transmitting the notification indicating approval of the request to access the encrypted enterprise data further causes the computing platform to:

> compare, by the data access engine, the private key to the most recently created private key; and
>
> determine, by the data access engine, that the private key matches the most recently created private key.

14. The computing platform of claim 8, wherein the instructions, when executed, further cause the computing platform to maintain, by the logic engine, a relationship between the discrete components of the enterprise data.

15. One or more non-transitory computer-readable media storing instructions that, when executed by a computing platform comprising a hybrid memory cube processor, at least one additional processor, memory, and a communication interface, cause the computing platform to:

> determine, by a validation engine, whether enterprise data associated with an enterprise organization satisfies validation criteria;
>
> based on the enterprise data satisfying the validation criteria, divide, by a self-auto homomorphic encryption engine, the enterprise data into discrete components;
>
> generate, by a logic engine, a plurality of public keys and plurality of private keys;
>
> transmit, to the self-auto homomorphic encryption engine, the plurality of public keys, wherein each public key is used to encrypt the discrete components of the enterprise data;

> encrypt, by the self-auto homomorphic encryption engine, the discrete components of the enterprise data according to a plurality of encryption rules and using a public key of the plurality of public keys;
>
> transmit, by the self-auto homomorphic encryption engine, encrypted enterprise data to a data access engine;
>
> transmit, to the enterprise organization, the plurality of private keys, wherein a most recently created private key of the plurality of private keys is used to access, by the enterprise organization, the encrypted enterprise data;
>
> receive, by the data access engine and from the enterprise organization, a request to access the encrypted enterprise data using a private key of the plurality of private keys; and
>
> transmit a notification, wherein the notification indicates one of:
>
>> approval of the request to access the encrypted enterprise data; or
>>
>> denial of the request to access the encrypted enterprise data.

16. The one or more non-transitory computer-readable media of claim 15, wherein the instructions, when executed, further cause the computing platform to transmit, by a batch collection engine and to the validation engine, a collection of enterprise data, associated with the enterprise organization, collected over a period of time.

17. The one or more non-transitory computer-readable media of claim 15, wherein the instructions, when executed, further cause the computing platform to transmit, by an altered data collection engine and to the validation engine, the enterprise data, associated with the enterprise organization, that has been altered by the enterprise organization over a period of time.

18. The one or more non-transitory computer-readable media of claim 15, further including instructions that, when executed, cause the computing platform to transmit, by a streaming engine and to the validation engine, the enterprise data associated with the enterprise organization.

19. The one or more non-transitory computer-readable media of claim 15, wherein the transmitting the notification indicating approval of the request to access the encrypted enterprise data further causes the computing platform to:

> compare, by the data access engine, the private key to the most recently created private key; and
>
> determine, by the data access engine, that the private key matches the most recently created private key.

20. The one or more non-transitory computer-readable media of claim 15, wherein the instructions, when executed, further cause the computing platform to maintain, by the logic engine, a relationship between the discrete components of the enterprise data.

* * * * *